United States Patent
Kokemohr et al.

(10) Patent No.: US 10,049,477 B1
(45) Date of Patent: Aug. 14, 2018

(54) COMPUTER-ASSISTED TEXT AND VISUAL STYLING FOR IMAGES

(71) Applicant: Google Inc., Mountain View, CA (US)

(72) Inventors: Nils Kokemohr, Hamburg (DE); Aravind Krishnaswamy, San Jose, CA (US); Ronald Frank Wotzlaw, Mountain View, CA (US); Daniel Frederik Schwarz, Luebeck (DE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/752,658

(22) Filed: Jun. 26, 2015

Related U.S. Application Data

(60) Provisional application No. 62/018,390, filed on Jun. 27, 2014.

(51) Int. Cl.
| | |
|---|---|
| *G06T 15/00* | (2011.01) |
| *G06T 11/60* | (2006.01) |
| *G06T 11/00* | (2006.01) |
| *G09G 5/24* | (2006.01) |
| *G09G 5/30* | (2006.01) |
| *G09G 5/36* | (2006.01) |

(52) U.S. Cl.
CPC ............ *G06T 11/60* (2013.01); *G06T 11/001* (2013.01); *G09G 5/24* (2013.01); *G09G 5/30* (2013.01); *G09G 5/36* (2013.01)

(58) Field of Classification Search
None
See application file for complete search history.

(56) References Cited

U.S. PATENT DOCUMENTS

| | | | |
|---|---|---|---|
| 8,073,850 B1 | 12/2011 | Hubbard et al. | |
| 8,171,016 B2 | 5/2012 | Van De Sluis et al. | |
| 8,558,921 B2 | 10/2013 | Walker et al. | |
| 8,803,886 B2 | 8/2014 | Tsuda | |
| 2007/0070217 A1 | 3/2007 | Ebihara | |
| 2008/0021928 A1 | 1/2008 | Yagnik | |
| 2008/0114778 A1 | 5/2008 | Siegel | |
| 2008/0195657 A1* | 8/2008 | Naaman | G06K 9/00677 |

(Continued)

FOREIGN PATENT DOCUMENTS

| | | |
|---|---|---|
| EP | 1710717 A1 | 10/2006 |
| EP | 1816575 A1 | 8/2007 |

(Continued)

OTHER PUBLICATIONS

Liu et al. "Image Retaggig Using Collaborative Tag Propagation", IEEE Transactions on multimedia, vol. 13, No. 4, Aug. 2011.*

(Continued)

*Primary Examiner* — Yingchun He
(74) *Attorney, Agent, or Firm* — IP Spring

(57) ABSTRACT

Implementations can relate to providing computer-assisted text and visual styling for images. In some implementations, a computer-implemented method includes determining a set of characteristics of an image, and applying one or more first visual modifications to the image based on one or more of the set of characteristics of the image. The method can include receiving user input defining user text, providing the user text in the image, and applying one or more second visual modifications to the image based on the user text and based on at least one of the set of characteristics of the image.

20 Claims, 9 Drawing Sheets

(56) References Cited

U.S. PATENT DOCUMENTS

| | | | |
|---|---|---|---|
| 2009/0074261 A1 | 3/2009 | Haupt et al. | |
| 2009/0324137 A1 | 12/2009 | Stallings et al. | |
| 2010/0050090 A1* | 2/2010 | Leebow | G06F 3/048 |
| | | | 715/751 |
| 2010/0077003 A1 | 3/2010 | Kondo et al. | |
| 2010/0103277 A1 | 4/2010 | Leebow | |
| 2010/0277611 A1 | 11/2010 | Holt et al. | |
| 2010/0302594 A1* | 12/2010 | Chapman | G06T 11/60 |
| | | | 358/1.18 |
| 2011/0047517 A1 | 2/2011 | Lee et al. | |
| 2011/0195388 A1 | 8/2011 | Henshall et al. | |
| 2011/0320560 A1 | 12/2011 | Bennett et al. | |
| 2012/0013640 A1* | 1/2012 | Chen | G06T 11/60 |
| | | | 345/619 |
| 2012/0086792 A1 | 4/2012 | Akbarzadeh et al. | |
| 2012/0092528 A1* | 4/2012 | Jung | G06T 11/60 |
| | | | 348/239 |
| 2012/0269436 A1 | 10/2012 | Mensink et al. | |
| 2012/0323930 A1 | 12/2012 | Kennberg et al. | |
| 2013/0262536 A1 | 10/2013 | Avrahami | |
| 2013/0300748 A1* | 11/2013 | Yaeda | G06T 11/00 |
| | | | 345/467 |
| 2013/0311287 A1 | 11/2013 | Jacobson et al. | |
| 2014/0043363 A1 | 2/2014 | Bala et al. | |
| 2014/0278370 A1* | 9/2014 | Chen | G06F 17/24 |
| | | | 704/9 |

FOREIGN PATENT DOCUMENTS

| | | |
|---|---|---|
| JP | 2006-277169 A | 12/2006 |
| JP | 2007-094679 A | 4/2007 |
| JP | 2007-334712 A | 12/2007 |
| JP | 2008269411 A | 11/2008 |
| JP | 2013069185 A | 4/2013 |
| WO | WO2011/017653 A1 | 2/2011 |
| WO | 2011065236 A1 | 6/2011 |
| WO | 2012050672 A2 | 4/2012 |

OTHER PUBLICATIONS

Stack Overflow Community, downloaded @ https://stackoverflow.com/questions/21333241/set-background-color-based-on-users-text-input, posted online since Jan. 24, 2014, hereinafter referred as SOC.*

USPTO, First Action Interview, Pre-Interview Communication for U.S. Appl. No. 14/585,655, dated Jul. 15, 2016, 5 pages.

International Preliminary Report on Patentability from related International Patent Application No. PCT/US2012/042226, dated Dec. 23, 2013, 4 pages.

Notice of Reasons for Rejection (including translation) for Japanese Patent Application No. 2014-517024, dated Aug. 18, 2015, 6 pages.

Notice of Allowance for Japanese Patent Application No. 2014-517024, dated Dec. 14, 2015, 3 pages.

ISA/US. International Search Report and Written Opinion from related International (PCT) Application No. PCT/US2012/042226. 6 pages. Nov. 28, 2012.

Davis, Marc et al. "Mobile Media Metadata for Mobile Imaging." 2004 IEEE International Conference on Mutlimedia and Expo: Jun. 27-30, 2004, Taipei, Taiwan. IEEE Operations Center, Piscataway, NJ. vol. 3, pp. 1707-1710. Jan. 1, 2004.

Japanese Patent Office. Office action from related Japanese Application No. 2014-517024. 9 pages. dated Jan. 6, 2015.

European Patent Office. European Search Report from related European Application No. 12729781.0. 8 pages. dated Feb. 16, 2015.

IP Australia. First Examination Report from related Australian Application No. 2012273292. 3 pages dated Nov. 7, 2014.

"Auto Photo Editor—Automatic Batch Photo/Image Editing Converter Software." Zeallsoft; accessed webpage on May 7, 2014. http://www.auto-photo-editor.com/. 2 pages.

Ramalingam, Srikumar et al. "Lifting 3D Manhattan Lines from a Single Image." Computer Vision Foundation, ICCV2013. pp. 497-504. 2013.

O'Toole, Jessica. "Over: A Photo App for Typography Lovers." Appstorm. http://iphone.appstorm.net/reviews/graphics/over-a-photo-app-for-typography-lovers/. 7 pages. Feb. 15, 2013.

Dunker, Peter et al., "Content-Aware Auto-Soundtracks for Personal Photo Music Slideshows." Media Technology Lab (MTL), Gracenote Inc., IEEE. 5 pages. Jul. 15, 2011.

USPTO, Non-Final Office Action for U.S. Appl. No. 14/585,655, dated Sep. 19, 2017, 18 pages.

USPTO, Final Office Action for U.S. Appl. No. 14/585,655, dated May 26, 2017, 14 pages.

USPTO, Final Office Action for U.S. Appl. No. 14/585,655, dated Feb. 15, 2018, 23 pages.

* cited by examiner

COMPUTER-ASSISTED TEXT AND VISUAL STYLING FOR IMAGES

CROSS REFERENCE TO RELATED APPLICATIONS

The present application claims priority to U.S. Provisional Application No. 62/018,390, filed Jun. 27, 2014 and titled AUTOMATIC SUGGESTIONS FOR TEXT AND VISUAL STYLING IN IMAGES, which is incorporated herein by reference in its entirety.

BACKGROUND

The popularity and convenience of digital cameras as well as the widespread of use of Internet communications have caused digital images to become ubiquitous. For example, digital images such as photographs are commonly captured by cameras included in mobile devices such as phones, tablet computers, wearable devices, camera devices, etc. Images are also often posted to various Internet sites, such as web pages, social networking services, etc. for users and others to view. A user commonly edits an image by viewing the image in an editing program and using tools of the editing program to manually select and adjust various characteristics of pixels of the image, such as color, brightness, contrast, saturation, clarity or blur, etc., and/or add desired text to the image.

SUMMARY

Implementations relate to providing computer-assisted text and visual styling for images. In some implementations, a computer-implemented method includes determining a set of characteristics of an image, and applying one or more first visual modifications to the image based on one or more of the set of characteristics of the image. The method includes receiving user input defining user text, providing the user text in the image, and applying one or more second visual modifications to the image based on the user text and based on at least one of the set of characteristics of the image.

Various implementations and examples of the method are described. For example, applying one or more first visual modifications can include automatically generating text based on one or more characteristics of the set of characteristics and adding the generated text to the image. Providing the user text in the image can include refining the generated text with the user text to provide refined text in the image, where the generated text is different than the user text. For example, refining the generated text in the image with the user text can include replacing at least a portion of the generated text in the image with at least a portion of the user text. The one or more first and second visual modifications can include one or more visual style modifications for the image, and the one or more second visual modifications can be applied to the user text in the image.

Determining the set of characteristics of the image can include identifying characteristics. For example, the method can identify one or more image content characteristics that indicate one or more content subjects depicted in the image. For example, the content subject(s) can include one or more persons, moods of persons as indicated by one or more facial features of the persons, objects, landmarks, landscape features, and/or weather effects recognized and depicted in the image. The method can identify one or more condition characteristics based on data associated with the image, and which indicate one or more conditions associated with the image. The condition characteristic(s) can include a time at which the image was captured, a geographical location at which the image was captured indicated by location data, one or more events associated with a user associated with the image and indicated by calendar data, and/or one or more camera parameters of a camera that captured the image. The method can identify one or more user characteristics of one or more users associated with the image based on user data. For example, user characteristics can include one or more viewing or sharing activities associated with the image, and/or one or more activities associated with the image and associated with a social networking service.

The one or more visual style modifications can apply at least one edit operation to the image to provide one or more visual effects in the image, where the one or more visual effects can include a vintage effect, a lens flare effect, a vignette effect, a blur effect, and/or a frame effect. Generating text can include selecting the generated text from a list of predetermined text items associated with characteristic(s) on which the generated text is based. For example, the generated text can include a description of the characteristic(s), and/or descriptive information for a user associated with the image. Generating the text can include transforming the generated text to appear three-dimensionally within a scene depicted in the image. Generating the text can include modifying a portion of the image over which the generated text is to be placed, e.g., blurring, changing the color, etc. of the image portion. The method can further include providing display of a user interface responsive to second user input, and providing display of a plurality of modified images based on the image, where each modified image is based on at least one characteristic of the set of characteristics, and each modified image can include the user text and a different visual style modification.

In some implementations, a system to provide text and visual styling in images can include a storage device storing an image, and at least one processor operative to access the storage device. The at least one processor is configured to determine a set of characteristics of the image, generate text in the image based on one or more of the set of characteristics, provide the generated text in the image, determine a visual style modification based on at least one of the set of characteristics, and modify the image, including the generated text, to include the visual style modification.

In various implementations of the system, the processor can be further configured to receive user input defining user text, replace at least a portion of the generated text in the image with at least a portion of the user text; and apply one or more additional visual style modifications to the image. The one or more additional visual style modifications can be selected based on the user text and based on at least one of the characteristics. The processor can be further configured to determine and apply a color of the generated text based on color characteristics of at least one image feature depicted in the image. In some implementations, the processor can be further configured to, prior to applying the one or more additional visual style modifications, restore the image to a state prior to the modification of the image including the visual style modification.

In some implementations, a non-transitory computer readable medium having stored thereon instructions to provide visual modification to an image and, when executed by a processor, cause the processor to determine a set of characteristics of the image, receive user input defining user text, determine one or more visual modifications for the image based on the user text, and at least one of the set of characteristics, and modify one or more pixels of the image to apply the one or more visual modifications to the image. The one or more visual modifications can include adding the user text to the image.

In various implementations of the computer readable medium, the one or more visual modifications can include one or more visual style modifications applied to the image, where the one or more visual style modifications can modify the user text added to the image. The instructions can further cause the processor to provide generated text in the image, where the generated text can be based on one or more of the set of characteristics, adding the user text to the image can include replacing at least a portion of the generated text with at least a portion of the user text, and the one or more visual modifications can modify the image and the user text with one or more visual style modifications.

In some implementations, a device includes means for determining a set of characteristics of an image and means for applying one or more first visual modifications to the image based on one or more of the set of characteristics of the image. The device includes means for receiving user input defining user text, means for providing the user text in the image, and means for applying one or more second visual modifications to the image based on the user text and based on at least one of the set of characteristics of the image.

The means for applying one or more first visual modifications can include means for automatically generating text based on one or more characteristics of the set of characteristics and adding the generated text to the image. The means for providing the user text in the image can include means for refining the generated text with the user text to provide refined text in the image, where the generated text is different than the user text. For example, means for refining the generated text in the image with the user text can include means for replacing at least a portion of the generated text in the image with at least a portion of the user text. The one or more first and second visual modifications can include one or more visual style modifications for the image, and the one or more second visual modifications can be applied to the user text in the image.

The means for determining can include means for identifying characteristics. For example, the device can include means for identifying one or more image content characteristics that indicate one or more content subjects depicted in the image, e.g., based on pixel values of one or more pixels in the image. The content subject(s) can include one or more persons, moods of persons as indicated by one or more facial features of the persons, objects, landmarks, landscape features, and/or weather effects recognized and depicted in the image. The device can include means for identifying one or more condition characteristics based on data associated with the image, and which indicate one or more conditions associated with the image. The condition characteristic(s) can include a time at which the image was captured, a geographical location at which the image was captured indicated by location data, one or more events associated with a user associated with the image and indicated by calendar data, and/or one or more camera parameters of a camera that captured the image. The device can include means for identifying one or more user characteristics of one or more users associated with the image based on user data. For example, user characteristics can include one or more viewing or sharing activities associated with the image, and/or one or more activities associated with the image and associated with a social networking service.

The one or more visual style modifications can apply at least one edit operation to the image to provide one or more visual effects in the image, where the one or more visual effects can include a vintage effect, a lens flare effect, a vignette effect, a blur effect, and/or a frame effect. The means for generating text can include means for selecting the generated text from a list of predetermined text items associated with characteristic(s) on which the generated text is based. For example, the generated text can include a description of the characteristic(s), and/or descriptive information for a user associated with the image. The means for generating text can include means for transforming the generated text to appear three-dimensionally within a scene depicted in the image. The means for generating text can include means for modifying a portion of the image over which the generated text is to be placed. The device can further include means for providing display of a user interface responsive to second user input, and means for providing display of a plurality of modified images based on the image, where each modified image is based on at least one characteristic of the set of characteristics, and each modified image can include the user text and a different visual style modification.

DETAILED DESCRIPTION

Figure 1:
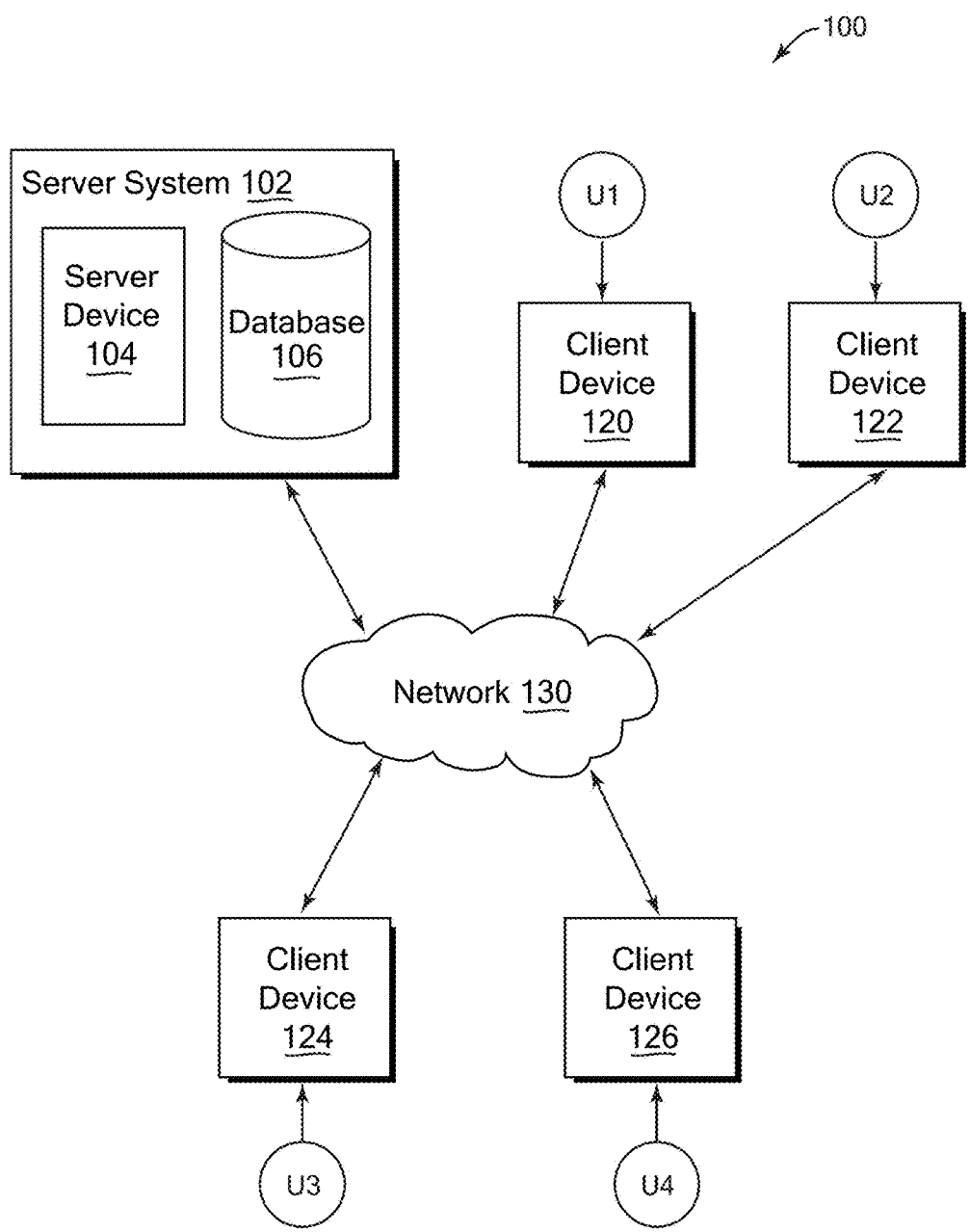
FIG. 1 is a block diagram of an example network environment which may be used for one or more implementations described herein.

One or more implementations described herein generally relate to providing computer-assisted text and visual styling for images. A method, device and/or system can provide modified versions of images having added text and/or added visual style modifications. For example, added text and visual style modifications can based on one or more determined characteristics of the image. Further, user text input by a user can be added to a modified image and visual style modifications can be based on the user text. For example, such features can automatically provide relevant and appropriate text and visual style modifications for images of a user without requiring extensive time and effort by the user to perform such modifications.

In various examples, a system can detect characteristics associated with the image such as image content subjects, conditions associated with the image, and user characteristics of a user associated with the image. For example, the characteristics can indicate image content subjects such as faces, persons, objects, landscapes, weather effects, and moods of persons (e.g., based on facial expressions, etc.) detected in the image. Image characteristics can also indicate conditions, e.g., time of image capture, geographical location of image capture, events based on calendar data, events determined based on identified objects and/or faces, viewing and/or sharing activities associated with the image, activities associated with the image on a social networking service, camera parameters, etc. Image characteristics can also indicate characteristics of an associated user based on social data, e.g., user comments, ratings, etc. Based on such characteristics, the system can generate text, e.g., a greeting, descriptive message, etc., and can add the text to the image. The system also can determine a visual style modification based on the characteristics, e.g., a vintage effect, lens flare effect, a vignette (e.g., fading dark border), drama effect, black and white effect, tinting, darkening, brightening, blurring, etc. The system can apply the visual style modification to the image as well as to the generated text to create a suggested modified image. For example, the style modification to the generated text can cause the text to appear as part of or integrated in the modified image. User interface features are also described. Some features allow a user to input desired user text that added to the image, e.g., adds to, or replaces all or part of generated text. Visual style modifications based on the user text can be applied to the image to create relevant visual styling. Some features allow the user to view multiple modified images, each modified image having different generated text and/or visual style modifications applied to the original image or other image derived from the original image.

Described features allow relevant and appropriate modifications, such as added text and visual styles, to be automatically generated for an image, e.g., as suggestions to allow a user to personalize an image. The text and/or visual style can be based on the depicted content and/or other characteristics of the image, allowing appropriate visual changes to be automatically applied to the image. The user can be saved time and effort in the creation and application of text and visual styles for images. For example, such savings can be significant if the user has a large number of images in their albums and other collections. Some implementations can also allow a user to customize the text and/or visual styles that are added to the image, providing greater control to the user without requiring user effort to originate text and visual style modifications. In consequence, less effort and resources are needed for a user to effectively edit an image. Thus, a technical effect of editing images as disclosed herein include a reduction in duration of editing images, thus saving time, energy, and system resources for achieving edits to images. For example, using described features, an image can obtain enhancements that would require many manual edit operations and use of system processing, memory, and other storage in previous editing programs. Another technical effect is a higher quality of modifications to images resulting from text and visual style suggestions that are appropriate to image content and other image characteristics.

An image, as referred to herein, can be a still image or standalone image, or can be an image in a series of images, e.g., a frame in a video sequence of frames. For example, implementations described herein can be used with a single image or with a series or video sequence of images. An edit operation (e.g., filter) can be an image processing operation or technique, e.g., modifying color, size, orientation, compression (which may not alter color), visible area (e.g., via cropping or other operation), or other image characteristics. In some examples, an edit operation performs a modification to one or more pixels of an image, causing a visual change in the image. For example, a visual modification, as referred to herein, changes the visual appearance of an image and updates one or more pixel values of one or more pixels of the image to adjust a visual characteristic of the image including brightness, contrast, dynamic range, and/or color (e.g., hue). Visual modifications can include changes or additions of text in an image and/or can include visual style modifications. Visual style modifications produce visual effects in an image that change pixel value characteristics in a non-textual way. For example, a visual style modification can use one or more edit operations to change the visual appearance of an image in a non-textual way, e.g., without changing or adding text characters appearing in the image. In some cases or implementations, a visual style can provide a particular non-textual visual form or manner in an image, expressing a particular tone, mood, tenor, character, etc. for the image. For example, darker visual style in an image may indicate a more serious or depressed tone in some contexts, while a "drama" visual effect style may indicate a more energetic tone.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other via network 130 and/or server system 102. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1-U4 may interact with each other via applications running on respective client devices and/or server system 102, and/or via a network service, e.g., a social network service, photo collection service, or other type of network service, implemented on server system 102. For example, respective client devices 120, 122, 124, and 126 may communicate data to and from one or more server devices (e.g., server system 102). In some implementations, the server system 102 can provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other socially-related functions. For example, users can view content such as images sent or streamed to their client devices originating from a different client device via a server and/or network service, or originating from a server system and/or network service. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126. Such an interface can be displayed using software on the client device, software on the server device, and/or a combination of client software and server software executing on the server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data, e.g., visual data, audio data, etc. at the client device.

In some implementations, server system 102 and/or one or more client devices 120-126 can provide an image editing program. The image editing program may allow a system (e.g., client device or server system) to provide options for editing and displaying an image, some examples of which are described herein. The image editing program can provide an associated user interface that is displayed on a display device associated with the server system or client device. The user interface may provide various options to a user to select editing options, editing modes, display modes, etc.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
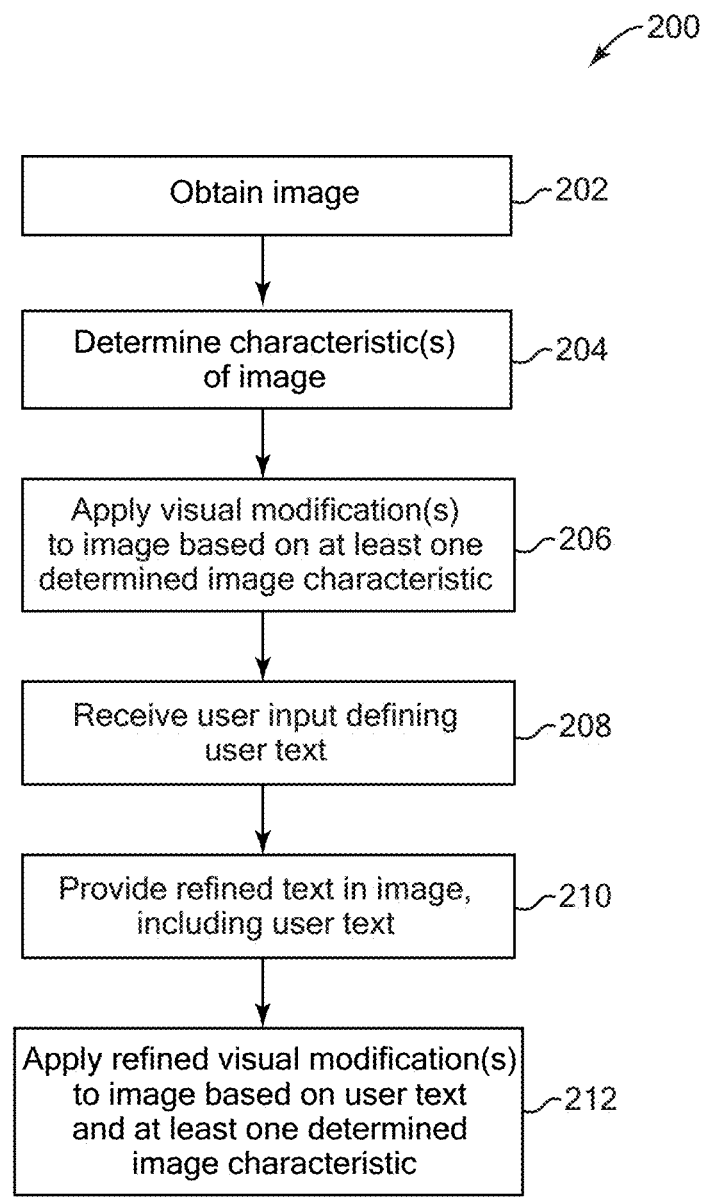
FIG. 2 is a flow diagram illustrating an example method to provide text and visual styling for images, according to some implementations.

FIG. 2 is a flow diagram illustrating one example of a method 200 to provide text and visual styling for images. In some implementations, method 200 can be implemented, for example, on a system such as a server device, e.g., server system 102 as shown in FIG. 1. In other implementations, some or all of the method 200 can be implemented on a system such as one or more client devices, and/or on both server device(s) and client device(s). In described examples, the implementing system includes one or more digital processors or processing circuitry ("processors"), and one or more storage devices such as a database 106 or other storage. In some implementations, different components of one or more servers and/or clients can perform different blocks or other parts of the method 200.

In some implementations, method 200, or portions of the method, can be initiated based on user input. A user may, for example, have selected the initiation of the method 200 from an interface such as a user interface of an application program, a network service interface, or other interface. In other implementations, the method 200 can be initiated automatically by a system. For example, the method 200 (or portions thereof) can be initiated based on one or more particular events or conditions such as a user opening an application program, e.g., an image editing application program, receiving one or more images that have been newly uploaded to or accessible by the system, etc. In some implementations, such conditions can be specified by a user in custom preferences of the user. In some implementations, the method 200 or portions thereof can be performed with guidance by the user. For example, a user can designate a set of multiple input images to be input and processed by method 200. In one example, method 200 (or portions thereof) can be performed on a cell phone, camera, or other client device that has captured one or more images. In addition or alternatively, a client device can send images to a server over a network, and the server can process the images using method 200, or the server can receive images from a different source (a different server, etc.).

In block 202 of method 200, the method obtains or selects an image for processing. The image can be a digital image composed of multiple pixels, for example, and can be stored on one or more storage devices of the system performing method 200 or otherwise accessible to the system, e.g., a connected storage device, a local storage device, a storage device connected over a network, etc. For example, the image can be a photo captured by a camera, an image frame extracted from a captured video stream or other video data, or an image derived from a different source. In some implementations, a user can provide or designate one or more input images to process. In other implementations, the image can be obtained by being automatically selected by the method, e.g., as an image from an album or other collection of multiple images, such as an album provided in an account of a user of a system or network service. In some examples, the method can determine which image to obtain based on evaluating one or more characteristics of accessible images, such as the color and/or brightness distributions of images, timestamps and other metadata of images, and/or identified and recognized content subjects depicted in the images, such as persons, faces, or objects. The image can be displayed on a display device in some implementations of method 200, or can be processed without display or with intermittent display. For example, the image can be displayed by an image editing program or other program running on the system that can offer features described herein.

In block 204, the method determines (e.g., detects) a set of one or more characteristics of the image. For example, in some implementations the determined set of characteristics can include image content characteristics, condition characteristics, and/or user characteristics. Image content characteristics can indicate or be related to content subjects depicted in the image and can be based on pixel values of one or more pixels of the image. Condition characteristics can indicate or be related to one or more conditions associated with the image. In some implementations, the conditions can be present near in time or during a capture of the image. In some examples, condition characteristics can be based on data associated with the image. User characteristics can indicate or be related to one or more characteristics of a user associated with the image, e.g., an owner or provider of the image, as indicated by user data. Some examples of image characteristics are described below with reference to FIG. 3.

In block 206, the method applies one or more visual modifications to the image based on at least one of the determined image characteristics. For example, the method can determine and apply the one or more visual modifications based on the at least one image characteristic. In some implementations, the visual modifications can include generated text provided in the image. For example, in some implementations the generated text can be derived from stored text data associated with one or more particular image characteristics or combinations of image characteristics. In various implementations, the generated text can be placed in the image by modifying image pixels, and/or can be one or more separate visual objects positioned in particular locations in the image and displayed over portions of the image.

The applied visual modifications can also or alternatively include one or more visual style modifications that change the visual appearance of the image, and which can be determined based on one or more of the determined image characteristics or a combination thereof. For example, a visual style modification can be a non-textual modification to one or more pixel values of one or more pixels of the image, e.g., changing colors, effects, or other visual characteristic of the image. In some cases where generated text is provided in the image as described above, the applied visual style modification can also modify the generated text. Some examples of text- and style-type visual modifications are described below with reference to FIG. 3.

In block 208, the method may receive user input defining user text. For example, a user may have input text characters to an image editing interface or other interface using any of a variety of input devices.

In block 210, the method provides refined text in the image, where the refined text includes the user text. In some implementations, refined text can be considered text that has been refined based on user input. For example, in some cases the refined text can only include the user text that is added to the image, e.g., where the user text replaces all generated text in the image if such generated text is present in the image (e.g., from block 206). In some cases in which generated text is present in the image, the refined text can include the user text and can also include at least a portion of the generated text. For example, the user text may modify the generated text, e.g., replace at least a portion of the generated text with at least a portion of the user text, thereby providing refined text that includes the user text and remaining portion(s) of the generated text. In some cases, the user text can be added to generated text such that the refined text includes the user text and the generated text. In some implementations, block 210 can be considered to refine generated text in the image (if any) with the user text to provide refined text, e.g., replace and/or add to at least a portion of generated text with user text. Similarly to the generated text, refined text can be added to the image by modifying image pixels, and/or can be one or more separate visual objects positioned in particular locations in the image and displayed over portions of the image.

In block 212, the method applies one or more additional visual modifications, e.g., refined visual modifications, to the image based on the user text and based on at least one of the determined image characteristics. In some implementations, the refined visual modifications can be based on the refined text that includes the user text. In some examples, the refined visual modifications can include refined visual style modifications, which change image colors, brightnesses, or other visual characteristics. In some implementations, the modified image resulting from block 212 can be displayed or otherwise presented as a suggested or variation modified image with respect to the image obtained in block 202. Multiple modified images with different refined visual modifications can also be created and displayed. Examples of some implementations are described below with respect to FIG. 3.

Figure 3:
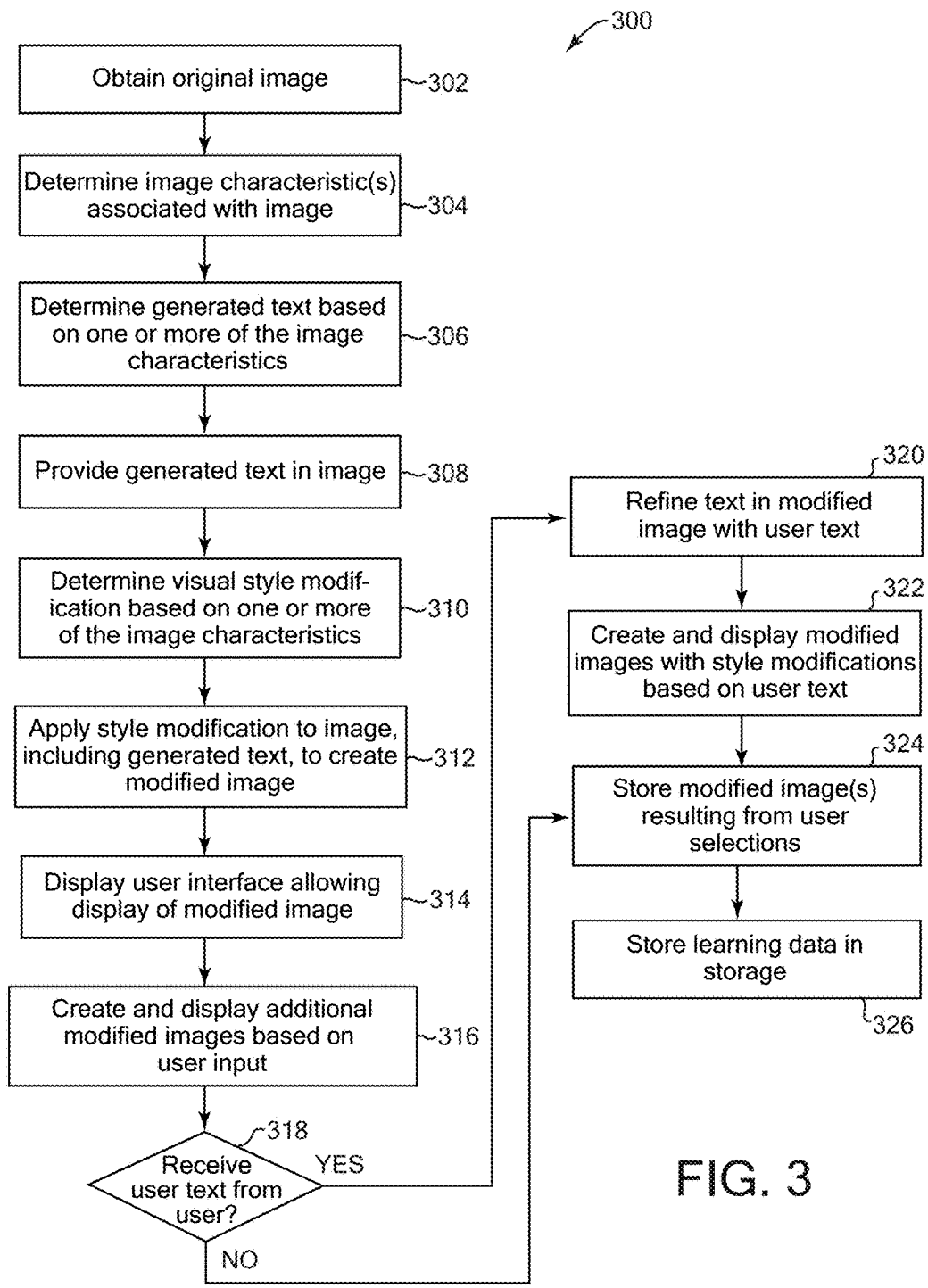
FIG. 3 is a flow diagram illustrating another example method for providing text and visual styling for images, according to some implementations.

FIG. 3 is a flow diagram illustrating another example method 300 for providing text and visual styling for images, according to some implementations. Method 300 can be similarly implemented by a system that is or includes, for example, a server and/or client device, and can be similarly initiated and performed, as described above for method 200.

In block 302, the method obtains an original image similarly as described above for block 202 of FIG. 2. In block 304, the method detects one or more image characteristics associated with the original image. For example, the characteristics can be image content characteristics, condition characteristics, and/or user characteristics.

Image content characteristics can indicate one or more types of image content subjects depicted in the original image. For example, one type of content subject can be faces depicted in the image. Another type of content subject can be persons depicted in the image (e.g., full or partial bodies of persons depicted). Another type of content subject can be objects in the image, including animals, vehicles, articles, devices, buildings, or other objects. Another type of content subject can be landscape features, which can include hills, mountains, lakes, rivers, sky regions, sky features (e.g., clouds, sun), trees, grass, roads, or other outdoor features. Another type of content subject can be weather effects, including stormy weather, sunny weather, rainy weather, windy weather, snowy weather, foggy weather, and other weather effects present in the scene depicted in the image. Another type of content subject can be an emotional tone of particular content subjects in the image. For example, the moods of one or more persons depicted in the image can be image content characteristics. These moods can include, for example, happy, sad, angry, thoughtful, solemn, depressed, etc.

Image content characteristics can be identified based on various image recognition techniques. For example, facial recognition, object recognition, and landmark or landscape recognition techniques can be used to detect these types of content subjects. In some implementations, various such recognition techniques can look for particular patterns, colors, markers, spatial distances between objects, color edges, etc., and/or compare detected image features to known patterns, image samples, etc. to recognize features. The moods of persons detected in the image can be detected using facial analysis techniques to determine the shape of mouth, state or shape of eyes, etc. of depicted persons. Colors, brightness, saturation, and image features of depicted outdoor areas can be examined to estimate a weather effect present in the image. For example, orange, pink, tones in the image may indicate a sunset weather effect, while grey tones may indicate stormy or rainy weather effect. In some cases, image content subjects can be detected as a general type of content subject (e.g. person, animal, object, etc.) without determining an identity of the particular subject depicted. In other cases, image content subjects have an identity that can be recognized and determined by the method, e.g., a name of a depicted person (e.g., in some cases a person's identity is determined only if permissions of that user allow such determination), the make, model, and/or owner of a vehicle, etc. For example, one or more databases, network services, and/or other information sources may be accessible allowing identities to matched to detected image content subjects (e.g., if user permission allows such identification).

Condition characteristics can indicate conditions associated with the image. For example, condition characteristics can be conditions associated with the capture or a modification of the image. For example, these can be conditions present near in time or during the image capture. In some implementations, data describing condition characteristics can be obtained from metadata that accompanies the image. For example, one type of condition characteristic can be the time (including year, day, hour, minute, etc.) that the image was captured, e.g., by a device including a camera.

Another type of condition characteristic can be location data indicating or describing the geographic location at which the image was captured. For example, this geographic location data may have been obtained by a Global Positioning System (GPS) component of the camera or other device capturing the image, and/or obtained by other sensor or location systems, for example. In some examples (e.g., where GPS location data is absent or unreliable), the geographical location of image capture can be estimated based on other data. For example, device-free localization techniques can be based on detected changes in peer-to-peer wireless signals, Wi-Fi networking signals, or other signals transmitted as a device is moved, where the changing of these signals can be measured and used to estimate device location. In some implementations, the location of image capture can be estimated to be on a vehicle (train, car, airplane, etc.), e.g., based rate and velocity of movement of the camera device as determined based on location signals, and/or based on examining image content (e.g., depicted airplane window), time gap between sensed locations of the camera device, etc.

Another type of condition characteristic can be events that were taking place at the time of, or in association with, the capture of the image and/or in association with a user who is associated with the image, e.g., a user who captured the image, or an "owner" of the image who is a user having control of the display of the image on a service (e.g., a social networking service or other network service). For example, event information may have been previously stored as metadata for the image, or can be accessed from storage devices during the processing of method 300. In some examples, event information can be obtained and identified from calendar data of the user, social data of the user, or other data accessible to the device checking for events, e.g., a camera or other device writing metadata that indicates a particular event occurring at the time of image capture. Events can be, for example, sporting events, music events, business-related events, a vacation or holiday, etc. In some implementations, the method can compare identified image content of the image (as determined above) with event information associated with that image to determine whether the image was captured at an event. For example, if the image includes persons or objects or is related to a location determined to be related to a particular sport (e.g., a type of ball or particular uniform or helmet on players is depicted in the image, a geographical location of a type of field or court at which the scene takes place is associated with the image, etc.), and a particular sporting event is indicated in the user's calendar as the event information occurring at the time of image capture, then the method can determine that the image was captured at the sporting event. In another example, the system can examine associated calendar information and geographical location data and determine that the image was captured while the user was on vacation at a particular geographic location. In some implementations, the method can consult online data sources (e.g., map services, event or activity websites) to identify events at particular times and/or locations.

Another type of condition characteristic can be parameters of the camera that captured the image. The camera parameters can include, for example, the make and model of the camera and lens information for lenses used by the camera, as well as particular values for camera settings used for the capture of the image, e.g., exposure level, zoom level, spatial orientation information indicating the spatial orientation of the camera in space at the time of image capture, aperture setting, shutter speed, focal length, etc. For example, EXIF data, ISO data, etc. for the image can be obtained. In some implementations, for example, ISO settings and/or other EXIF data can be used to assist determining whether the image was captured in an indoor, outdoor, cloudy, or sunny environment.

User characteristics can indicate characteristics of one or more users associated with the original image. For example, an associated user can be an owner of the image, e.g., a user that uploads the original image to a network service (e.g., an online photo collection service, a social networking service, etc.). In some implementations, an associated user can be a user associated with the camera that captured the image, and/or a user who last modified the original image. In some implementations, an associated user can be a user that is able to access and view the image. An associated user can be determined based on any of various sources including metadata of the original image, a user account of a network service or user registered to a device in which the original image was stored, etc. In some implementations, user characteristics can indicate characteristics of an associated owner or accessing user, and/or can indicate characteristics of one or more other types of associated users, e.g., users that are socially-linked with an associated owner user, users that are depicted in the image, etc.

In some implementations, user characteristics can be identified from received user data related to the associated user. For example, user data can include social data, e.g., data stored by a network service or other system describing social connections or social graph of the associated user of the image (e.g., user contacts, recipients of user messages, etc.). In some implementations, social data can be examined upon obtaining permission from the associated user. The social data can describe user activity made in social contexts, e.g., user input to network services, as well as views or downloads of messages, content, etc. received by the user.

For example, user activity can include user comments, ratings, shares, and views of the original image used in method 300, other images of an associated user, and/or other user's images, and/or other types of content. In some examples, the social data can be obtained from a social networking service of which the associated user is a member. For example, the user characteristics can include one or more viewing or sharing activities associated with the image used in method 300, and/or one or more activities associated with the image and associated with a social networking service or other network service.

In some implementations, social data can be used to find out subjects or events of value to the user, e.g., based on postings or uploaded content provided by the user to a social networking service or other network service. In another example, user characteristics can include social relationships of the associated user to persons or other image content subjects depicted in the image. For example, a social graph included in obtained social data can be used to identify whether recognized and identified persons depicted in the image are close friends, work colleagues, etc., of the associated user. These social relationship user characteristics may be able to provide guidance as to text or style provided in the following blocks of method 300. For example, if the method determines that a close friend of the associated user is depicted in the original image, then text and/or visual style modifications associated with friendship can be accessed for consideration to be provided in or applied to the image as described below. In some implementations, user data can also include other data input by the user or describing the user, e.g., profile data, calendar data, etc.

Some implementations can determine three-dimensional (3D) information regarding content depicted in the image. For example, a 3D scene structure or 3D model for the image can be estimated to determine 3D positions of various image features. In some implementations, depth information, a depth map, or other 3D model information for the image may be available, e.g., as metadata provided by a camera having an ability to sense "depth" of objects or pixels in the image, where the depth is the distance of each captured object or pixel to the camera capturing the scene. For example, depth information can be generated using a 3D or stereo camera, structured light camera, time-of-flight camera, or other type of depth-sensing camera (using visible and/or non-visible light). Some implementations can estimate depth information of a depicted scene based on a system analyzing features depicted in the image. For example, known techniques can estimate a basic 3D structure in an image based on lines (e.g., edges), intersections of lines, planes, and/or vanishing points detected in and extracted from the image. Relative sizes of recognized objects can also be compared to estimate depth of various areas or pixels. Some implementations can use known 3D models (e.g., of faces) to estimate depths of particular pixels in features having a recognized type matching those models.

In block 306, the method determines generated text for the image based on a set of one or more of the image characteristics determined in block 304. Generated text can be automatically generated by the method, e.g., without human intervention. Generated text can include one or more text characters and/or other predefined symbols or ideograms (emoji, etc.).

In some implementations, the method can determine the generated text based on stored predefined associations of particular text items with particular image characteristics. For example, the method can examine and select one or more stored text items from a list of predetermined candidate text items associated with particular image characteristics, or combinations of the image characteristics, detected in block 304. The selected text item(s) can form the generated text message. A text item can be one or more text characters, messages, phrases, sentences, words, or other item of text. For example, the method can use a number of predefined relationships between types of characteristics and predetermined text items stored in available storage for access by the method.

In some examples, a particular type of image characteristic, or a particular combination of types of characteristics, can be associated with a particular stored text item. For example, if a combination of characteristics associated with (e.g., required by) a text item are present for the original image, then that text item can be selected for the image by block 306. In one example, a candidate text item providing a user's identified name (e.g., first name) can be associated with image characteristics including a face of that user recognized and identified in the image. In another example, a candidate text item that states "sunny memories" can be stored to be associated with a stored combination of characteristics that are required to be present in the image for the text item to be selected for the image. For example, the required combination of characteristics can include an image characteristic indicating a sunny weather effect depicted in the image, and an image characteristic indicating that the time at which the image was captured is sufficiently in the past (e.g., greater than a threshold time period in the past relative to the current time). In some implementations, that text item can also be associated with (and require) additional image characteristics in the combination of characteristics. For example, the text item can be associated with particular types of content characteristics, e.g., an outdoor landscape and persons depicted in the image (e.g., particular recognized persons having identities socially connected to the user as determined by social data from a social networking service or other network service). In one example, if all of these types of characteristics are present for the image, the "sunny memories" text item is selected (e.g., from a table or other stored data structure) for inclusion in the generated text. In another example or implementation, if any of these required types of characteristics are present in the image, or a predefined subset of required characteristics is present, the associated text item is selected for inclusion in the generated text.

Some implementations can find and select text items based on a semantic meaning of an image characteristic. For example, a label of "corvette" from an image recognition technique that recognized a content subject in the image can be analyzed for semantic meaning by the method. In some examples, the method can look in accessible dictionaries, thesaurus, databases, knowledge bases, etc. to find additional words of similar meanings as well as words describing various subject categories in which this label fits. For example, the method or an image recognition technique can determine that additional labels of "car" and "vehicle" also apply to the label. Text items that are associated with these additional labels can then be searched, evaluated and/or selected. In some implementations, one or more of the additional determined labels can be selected and included in the generated text.

In some implementations, stored text items can have scores with respect to the original image based on how suitable or qualified the text item is for addition to the original image. For example, the scores can be based on the number of characteristics in the original image that match characteristics associated with the stored text item. For example, the method (or associated method) can determine a score for each examined stored text item. In some examples, a score can be determined by checking for a number of matches between characteristics and/or types of characteristics present in the original image, and the characteristics and/or types of characteristics required by a stored text item. The greater the number of matches between image characteristics and the associated characteristics of a stored text item, the higher the score assigned to that stored text item. One or more stored text items having the most qualifying scores (e.g., a predetermined number of the highest scores) can be selected as text items for use with the original image. Other scoring criteria and/or selection criteria can also or alternatively be used for selecting text items. For example, different weights can be assigned to different characteristics or types of characteristics if a match exists, where a weight can influence the associated score based on the value of the weight. For example, a match for content subject type characteristics can be weighted higher, while a match between location characteristics can be weighted lower or a normal amount. Other weighting techniques can be used in other implementations.

In various examples, the generated text can include a standard greeting, e.g., a well-known saying or greeting. The generated text can include a greeting based on particular metadata, e.g., geographical location and calendar/event data. For example, the generated text can include a vacation greeting such as "Welcome to Spain" or a message such as "My vacation in Spain," and can be determined based, at least in part, on location data indicating the location where the image was captured. Generated text can also include event-specific text, such as a text item that includes the title and/or geographic location of the event (e.g., "Art and wine festival, Springfield.") In some cases the generated text can include a description of at least one of the detected characteristics of the image, e.g., a description of a content subject characteristic (person, animal, object, etc.) or a description of a condition characteristic (the time or year, location, event, etc.). In some implementations, text items can be obtained as recognized labels from one or more image recognition techniques applied to the original image, for example.

In some implementations, if no specific predetermined text items are found to be strongly associated with the original image (e.g., all available stored text items are below a threshold number of matches in characteristics, or have an indicator of weak association with the image), then a more generic text item can be selected as generated text that describes one or more image characteristics. For example, a generic text item can include text describing condition characteristics such as a geographic location of image capture, and a time, date, and/or year of image capture. A generic text item can include a name of a user associated with the image or a generic label associated with a recognized content subject depicted in the image. A combination of multiple of these generic text items can also be included in the generated text.

In some implementations, the method can examine data related to an associated user and/or other users to help determine the generated text. For example, posted content, comments, and other input from an associated user and/or other users socially connected to the user can be examined, based on obtained social data associated with the user. In one example, direct quotes from the associated user's own messages in a social networking service, other network service, or other online activity can be included in the generated text.

Some implementations can determine parts of generated text independently and separately, and then combine the parts together to form the complete generated text. For example, a sunny weather effect depicted in the image can indicate to the method to select a text item that is the word "sunny," and an old capture date of the image can indicate to the method to select a text item that is the word "memories," and these words can be combined to create the generated text "sunny memories."

Block 306 (and/or other blocks of method 300) can also determine one or more text attributes of the generated text, such as font, color, size, layout (e.g., justification, positioning of letters relative to each other, how many lines of text to form, etc.), letter case, and/or other text attribute types. Text attributes can be determined from a variety of possible text attribute selections in each type of text attribute. For example, the text attributes can be based on stored user preferences or settings.

In some implementations, the method automatically selects text attributes that are predefined to be associated with particular text (e.g., particular words or semantic meaning/synonyms of the generated text), with determined image characteristics of the image, and/or with a particular visual style determined for the image (described below). For example, predefined associations of particular text attributes with text, image characteristics, and/or visual style modifications can be based on previous determinations (e.g., by one or more users or persons) that these associations are visually pleasing when displayed. In some examples, the method can examine a predefined table or other associative data structure that matches particular text attributes with particular text, image characteristics, and/or visual style modifications. In one example, a older-style cursive or script font can be a text attribute associated with particular recognized types of image content (e.g., old buildings, etc.), while a lively or chaotic font can be associated with image content including lots of faces, persons, or a city landscape. In other examples, a particular font can be associated with a particular visual style such as "vintage" (e.g., adding an old-fashioned or worn look for the image to simulate a look of an old photograph by changing color and brightness, adding image features such as scratches, etc.). A recognized image subject of two people kissing can be associated with a particular "love" text font and/or text style theme. A particular word in the text (e.g., "memories") can be associated with a particular font, size, color, etc. (e.g., a classic or old-style font). Some implementations can group particular text attributes, e.g., fonts, text styles, or text layouts, with particular languages or scripts that are known to be visually suitable for use with those text attributes. For example, Arabic text may not be visually appealing in a block justified layout such that a justified layout attribute is not available to be selected and applied to generated Arabic text.

In some implementations, one or more text attributes can be based on one or more image characteristics. For example, a color of generated text and/or user text can be based on color characteristics of one or more image features depicted in the image. The image features can be a portion of the image on which the text is to be placed, or can be positioned elsewhere in the image and, e.g., provide a color scheme for image. In one example, if the text is to be placed on a sky landscape feature, the text can be assigned a color visually pleasing or contrasting with the sky color. The text can be assigned a color that is complementary, part of a triad of colors, and/or an analog color to a color of one or more image features. The text can be assigned a fill pattern, texture, or other visual effect similarly based on one or more visual characteristics. Other text attributes can be designated based on one or more image characteristics, e.g., font, size, layout, etc., based on any of the image characteristics described above. In another example, the method can determine to use a fully justified layout of the text based on recognizing straight edges in the image, such as walls, that are visually complementary with the straight margin edges of fully justified text.

In some implementations, multiple different types of a particular text attribute can be applied to the generated text. For example, multiple different fonts can be used, e.g., one font for one text line of words and/or characters of the generated text, and a different font for a different text line or characters of the generated text. Some implementations can access predefined stored groups of fonts that are known to be visually pleasing when appearing in conjunction in text, such that fonts for the generated text can be selected from the same predefined group. In some implementations, machine learning techniques (e.g., including training based on a set of training data indicating desirable pairings and combinations of fonts) can be used to train a system to automatically determine a visually complementary font to a designated input font. Similarly, combinations of multiple different selections of colors, sizes, and/or other text attributes can be used in the generated text, and such selections can be determined from one or more predefined groups indicating which of the attributes, and/or which of the selections of a particular attribute, are considered visually pleasing when used in combination. For example, multiple complementary colors, triad colors, and/or analog colors can be selected for the generated text.

The generated text can also or alternatively be partially or entirely rotated to various orientations for placement in the image, in some implementations. For example, entire words or phrases of the text can be rotated, and/or individual characters of the generated text can be rotated, including letters, numbers, etc. Graphical ornaments, frames, etc. can also be rotated. Some implementations can add visual effects to the generated text. For example, some added visual effects can cause the generated text to stand out or be more visible within the image. In some examples, a drop shadow, outline, border, or differently-colored backdrop can be generated behind and/or around the generated text to appear within the image. In other examples, text can be converted to outlines and filled with patterns, image portions, etc. Other visual effects added to text can include text embossing and text extrusion.

In block 308, the method provides the generated text in the image. For example, the method can add or superimpose the generated text on the image. In some examples, the method can change pixel values of the image to cause the appearance of the characters of the generated text in the image. In some implementations, the generated text can be added to the image as a separate layer or as a text object that is separable and independent from the image pixels, and which, for example, can be easily moved within the image or removed from the image if needed. In some examples, a separate text object including the generated text can be temporarily created and placed over the image, and after modifications to the original image have been finalized, the generated text can be added to image by changing the pixel values of the image. Some implementations can permanently store a text object separately and in association with the image over which it is displayed.

In some implementations, the location in the image at which the generated text is displayed can be determined by the method based on determined image content and/or other image characteristics. Some implementations can position the generated text at one of multiple possible standardized or predefined locations in the image, e.g., a predetermined distance from a corner, side, top, and/or bottom of the image.

In some implementations, the generated text can be positioned in the image to minimize obscuration of content subjects of the image. For example, the generated text can be placed so as to not cover faces, objects, or other prominent features, while in some implementations the text can be allowed to cover one or more types of features (e.g., landscape features such as sky, road, trees, etc.). Some implementations can examine the image for candidate areas of the image having particular types of features or areas known to be suitable for displaying text without obscuring prominent features of the image. For example, the method can examine the image for an area of clear sky (e.g., using image recognition techniques) that is sufficiently large to fit the generated text. In some implementations, the method can examine the image for candidate areas that have small levels of color noise (e.g., under a threshold amount of noise), and/or candidate areas that have a small amount of texture or structure (e.g., under a threshold amount of texture/structure such as patterns of surface detail (e.g., rough, corrugated, streaked, dappled, etc.) and/or areas of pixels having rapid color changes, color discontinuities, or edges). The generated text can be placed in areas of the image having lower amounts of noise and texture. The size of candidate image areas can also be examined. For example, larger candidate areas can allow the generated text to have a larger size while smaller candidate areas may require the generated text to be of a smaller size. In some implementations, one or more of these image characteristics can be individually scored based on its suitability for placement of generated text. For example, for some implementations or styles, a larger size of a candidate area can be associated with a better individual score than a smaller size. The individual scores of each candidate area can be combined to find a total score for each candidate area in the image, and the best (e.g., highest) total score can indicate the associated candidate area of the image in which to place the generated text.

In some implementations, the generated text can be placed on a generated text path in the image. For example, the text path can be generated based on one or more image features. In some examples, the text path can follow edges or borders of objects depicted in the image, e.g., such that the generated text flows along the side of a road or building, around a face, tree, or cloud, etc. In some implementations, the image feature that is used to guide the text path can be selected from multiple recognized features in the image. In some cases, the image feature used for the text path can be selected based on the semantic meaning of the generated text. In one example, if the generated text is "Summer in Paris" and a monument feature associated with Paris is recognized in the image (e.g., the Eiffel Tower), then the text path can be generated along an edge of the Eiffel Tower rather than along other recognized image features (such as persons' faces, landscape features, etc.).

Some implementations can generate a text area, such as a text box, in which the generated text is to be placed (e.g., this text area can be determined in block 306 in some implementations). Such a text area can be included in a particular layout selected for the generated text from multiple layout options, e.g., indicating a number of lines to split the text, justification and word positioning, emphasis, text rotation, ornaments, frames, etc. added to the text, etc. The generated text area can be sized and shaped to fit the generated text, and a suitable area that fits the generated text area can be searched for in the image. For example, the largest suitable area that fits the text box can be searched for in the image. In one example, a layout for the generated text can be determined, and the dimensions of the layout are determined based on suitable areas in the image to place the text layout (e.g., the layout can be maximized in size to fit in available areas).

In various implementations, the generated text can be provided as a single line of text, or can be provided as multiple lines of text. In some cases, the generated text can be randomly split into multiple lines of text. For example, the multiple lines of text can be fitted to a generated text area. In some cases, particular words of the generated text can be considered more important (e.g., proper names, specific nouns, verbs, etc.) and can be emphasized in the text area relative to other words, e.g., placed such that those words are the only word on their line of text. In some examples, important words can be obtained from user data, e.g., a user's social data (socially-linked users, names or words from user comments, messages, etc.) or condition data, e.g., visited location names, event names, etc. In some implementations, particular words of the generated text can be considered less important such that multiple of those words are placed on a single line of text. For example, generic words such as "trip," "vacation," "event," etc. can be considered less important, as well as prepositions, linking words, etc. For example, the words "trip" and "to" can be placed on a single line of text. Some examples are shown with respect to FIGS. 11A-11C.

In some implementations, each word (or some words) in generated text and/or user text can be assigned an importance score based on these factors and other factors (e.g., frequency of appearance in user data, proper/specific name vs. generic word, etc.). For example, words can be positioned and/or emphasized in a generated text area based on their importance scores. In some examples, words having an importance score over a threshold score can be emphasized, and/or words having a better (e.g., higher) importance score than other words can be given priority in text lines, provided with more emphasis etc. In some examples, words can be emphasized by being placed singly on text lines, by being placed over particular backgrounds, ornaments, or blurs, by having borders such as text frames or ornaments, by being assigned a larger or more highlighted font (e.g., bold or italic letters, drop shadows, etc.).

Some implementations can modify a portion of the image, e.g., pixel values of the image, to create a suitable area in the image on or over which to place and display the generated text. For example, the method can blur an area of the image approximately equal to the size of the generated text, to provide a smoothed area allowing the generated text to be more visible. Some implementations can place a visible text area on the image having a color different than the color of the generated text to allow the generated text to be highlighted, e.g., a light color if the generated text has a darker color, or vice-versa. In some examples, an area of the image can be both blurred and darkened to emphasize light-colored text placed on the area. Some implementations can provide the generated text on a "thought bubble," and/or can blend the generated text with the image in one or more ways (e.g., place portions of the image within large generated text character outlines, provide semi-transparent text characters allowing portions of the image to be seen through the text characters, etc.). In some implementations, additional graphics can be added to and associated with the generated text, such as ornaments, text frames, lines, etc. displayed relative to the generated text. Some examples are shown and described with respect to FIG. 10.

In some implementations, the generated text can be placed in the image to appear as if it is three-dimensional (3D). For example, the text can be transformed to appear as if it has linear perspective within the scene of the image. In one example, one side or portion of the text can be made larger as if closer to viewer of the picture, while another side or other portion of the text can be made smaller as if further away from the viewer, with a gradual change provided from one size to the other. In another example, the generated text can be geometrically transformed to appear as if it is positioned on an estimated surface depicted in the image, e.g., wrapped around a 3D cylindrical curved surface. In implementations in which a 3D model of the image scene or 3D features of the image have been estimated (e.g., using associated depth information from a camera and/or using techniques for estimating 3D features in an image), the generated text can be placed to appear as if it is three-dimensionally aligned with 3D features depicted in the image. For example, the text can extend along or follow a road or a wall into the distance, appear to be on the side of a wall of a building, etc. One example of 3D text positioned based on an estimated 3D model of an image scene is described with reference to FIG. 12. In additional examples, 3D text can be positioned along a curved surface, border, or outline of a 3D object, e.g., along a text path curving on the surface of an object like a banana, cylinder, etc.

In block 310, the method determines a visual style modification for the image based on a set of one or more of the determined characteristics. The set of characteristics used here may or may not be the same set of characteristics used to determine the generated text in blocks 306 and/or 308. A visual style can be any type of style that provides the image with a particular visual effect. The visual style modification can include the application of a particular filter, preset, or other edit operation, or a combination of multiple edit operations. In some examples, the visual style modification can be a "vintage" effect which provides an old-fashioned or worn look to the image to simulate the appearance of an old photograph, e.g., a tinted, sepia-toned, and/or scratched appearance to the image. For example, this style can be achieved by applying a particular set of edit operations to the image, e.g., a particular color filter that biases the colors of the pixels of the image to the desired color, a filter that randomly adds scratches and blurs to the image by altering pixel values, etc. In another example, the visual style modification can be a lens flare that adds light rings or streaks to the image to mimic a lens flare appearing in a photograph when sunlight impinges on a lens. In another example, the visual style modification can be light streaks and color shifts in portions of the image simulating overexposed portions of a photograph. Another visual style modification is a frame added to the borders of the image and having a particular visual design (e.g., with multiple frames to select from, each having particular colors, texture, symbols, patterns, etc.). Other examples of visual style modifications include applying a tone mapping filter or technique to the image, changing the structure (e.g., sharpening edges or textures appearing in the image) or clarity (blurriness) of the image, a shadow effect (e.g., adding or darkening shadows, etc.), changing brightness, contrast saturation, and/or color, a "drama" effect that enhances contrasts and edges to make these features stand out, a soft focus or other blur effect, a simulated bokeh effect (blur produced in out-of-focus parts of the image), etc.

In some implementations, one or more visual style modifications can be automatically determined by the method (without human intervention) for application to the image based on stored predefined associations of visual style modifications and one or more of the determined image characteristics. For example, one or more visual style modifications can be selected from a predetermined stored list of candidate style modifications based on matches between image characteristics of the image and characteristics associated with the candidate style modifications. In some examples, visual style modifications can be selected similarly to text items as described above for block 306, e.g., based on number of matching characteristics, including weighting of particular matches, etc. In some examples, a detected outdoor scene depicted in the image (e.g. based on detected landscape features such as sky, green grass, trees, etc.) can be associated with a vignette style modification to darken the borders of the image. In other examples, an outdoor scene can be associated with a color enhancement filter to make the colors brighter and more enhanced, e.g., less washed out (e.g., increased saturation). A detected indoor scene (e.g., based on detected darker shades, detected objects such as furniture, etc.) can be associated with a red-eye filter to be used on detected faces in the image. Text labels or words derived from recognizing image content subjects can be associated with particular style modifications, such as the word "cat" (derived from content subject characteristics) associated with a particular filter. Similarly, text or words derived from user comments or posts in social data from an associated user can be associated with style modifications, such as a word "bright" (from the user describing a location) associated with brightening or color-enhancing the image. Content characteristics can be associated with visual style modifications, such as an old capture date for the image (e.g., more than a time period threshold) associated with a "vintage" style modification (e.g., add sepia tones and scratches to image, or desaturate the image to provide a black and white/grayscale effect). In some implementations, the associations between image characteristics and visual style modifications can be customized or personalized for the user associated with the image, such that different associations are used for images of different users.

In some implementations, the determination of a visual style modification can also be influenced by other data, such as preference data indicating preferences of an associated user for particular style modifications. In some implementations, the method can examine history data indicating previous selections of an associated user of particular style modifications for particular image characteristics, e.g., indicating general preferences of the user.

In block 312, the method modifies the image and the text message with the visual style modification determined in block 310 to create a modified image. In some implementations, the generated text can be added to the image before the visual style modification is applied to the image, and the generated text can be modified along with the rest of the image by the visual style modification. For example, a brightness-changing style modification can be applied to the image pixels including the generated text. In some examples, modifying the generated text may provide a more pleasing appearance of the text in the modified image, since it may appear as if the text is more integrated in or part of the image and may avoid or reduce an appearance of text having been placed or superimposed on top of the image. In some implementations, the method can store the modified image in available storage, e.g., memory, and the modified image can be displayed to the user, e.g., in the interface described below.

In block 314, the method provides the modified image for display to a user, e.g., in a user interface allowing a display of modified images. For example, a modified image can be displayed as a modified image variation derived from the original image. A modified image can show visual modifications of text and/or visual style applied to the original image, or in some implementations, a modified image can show visual modifications applied to one or more images derived from the original image.

In some implementations, the image(s) and interface can be displayed on a display device of the system implementing method 300. For example, the user interface can display the modified image of block 312 as well as various controls that can be manipulated by the user to create variations of the original image and/or the modified image, e.g., other modified images having different text and/or different visual style modification(s). For example, the interface can include a graphical user interface, command line interface, etc. Some examples of user interfaces using one or more features herein are described below with reference to FIGS. 4-7. In some implementations, the user can provide input in the interface to move the generated text to a desired location in the image if a default or automatically-determined location is not desirable, e.g., drag the generated text using a finger on a touchscreen or using a different input device (mouse, stylus, etc.). Some implementations can display the original image adjacent or near to the modified image so that the user can more easily view the differences in the original image and modified image. For example, in some implementations the modified image can be considered to be a suggested image for the user, e.g., showing and suggesting particular text and visual style modifications for the original image.

For example, input can be received from a user in the user interface, e.g., a selection by the user of an icon, command, menu item, graphical button, or other control of the interface. In various implementations, the input from the user can be provided as touch input on a touchscreen of a device used by the user, or can be input provided by the user using a different device, such as a mouse, trackball device, trackpad, joystick, etc. For example, a user-controlled cursor can be controlled to be positioned to select a desired control displayed in the user interface. In some implementations, the user input can take other forms, such as a voice or sound command input to a microphone of the system to select a function of the image editing program (e.g., recognized via voice recognition or sound command recognition), a visual command input to a camera or other visual sensor of the system and recognized by the system as a command (e.g., an eye-motion command, finger or hand gesture, etc.), or a motion command detected by motion sensors such as accelerometers and/or gyroscopes (e.g., moving or orienting a portable device in a predetermined manner to be recognized as a command by the system).

In block 316, the method may create and display one or more additional modified images based on user input. For example, block 316 may be performed if the user selects a control to display one or more modified images, e.g., variations of an image having different visual modifications. For example, if the user requests a modified image, in response, the method creates a modified image and, in various implementations, displays it in place of (or alongside) a previously-displayed modified image. Block 316 can create and display multiple modified images in response to appropriate user input commands. In some cases, a modified image can include different generated text than the generated text of one or more previous modified images. In one example, the method can repeat block 306 to create different modified images, where one or more (e.g., each) of the modified images has different generated text added to the original image based on at least one of the one or more characteristics of the original image. For example, in some implementations, the method can select the next text item in a list of text items found suitable for the image (e.g., candidate text items) as described above.

In some implementations, the method can select a different set of the characteristics (e.g., a different combination of the characteristics) than previously used to determine generated text in a previous modified image. Different generated text can be determined that is associated with (e.g., matches) the selected characteristic(s). In some implementations, one or more text attributes of the generated text can be varied in different modified images, e.g., where the same text characters can be used in one or more of the modified images, and/or different generated text characters. For example, different fonts, colors, sizes, or other text attributes can be provided for different modified image variations.

A modified image can also or alternatively include a different visual style modification than the style modification previously applied to the original image in block 312 (or previously applied to create a previous modified image in block 316). In one example, the method can repeat block 310 to create one or more modified images, where one or more (e.g., each) of the modified images has a different visual style modification for the original image based on a set of one or more characteristics of the original image. In some implementations, the method can select the next best (e.g., highest scoring) visual style modification that matches the set of characteristics of the image, e.g., from a list of candidate visual styles modifications as described above. In some example implementations, the method can select a different set of the characteristics (e.g., a different combination of the characteristics) than previously used to determine a visual style modification in a previous modified image. One or more different visual style modifications can be determined that are associated with (e.g., matches) the selected characteristic(s).

In various implementations or cases, the method can create a modified image with new generated text and/or new visual style modification(s) by modifying the original image as described above, or the method can modify a previous modified image, e.g., modify the most recent modified image to provide a new modified image. For example, each modified image can be created by applying one or more visual modifications to the original image obtained in block 302. In some implementations, the method can restore a modified image to its previous, original state which was prior to the modification performed in blocks 306 and 310, and then perform one or more visual modifications to create a modified image. The restoring can be implemented in different ways. For example, the method can retrieve a copy of the original image from storage where the copy had been stored before modification. In another example, the method can remove visual modifications that have been made in a modified image by changing pixel values back to their values in the original image.

Some implementations can create a modified image by applying one or more visual modifications to a modified image resulting from block 306 or to a modified image resulting from block 310. For example, a previous state of the image can be restored, e.g., by retrieving a copy of the image in the previous state from storage, or by removing previously-applied visual modifications by changing pixel values in the image to previous values, and then applying the visual modifications to the previous-state image. Some implementations can create a modified image by applying one or more visual modifications to a modified image resulting from previous application of one or more visual modifications by block 316.

In some implementations, a single modified image is displayed at one time by the display device (e.g., on a display screen). For example, the user can provide input selecting to display a new modified image, and the display of the new modified image replaces the display of a previously-displayed modified image. In some implementations, the user can select to display a number of different modified images simultaneously by the display device.

The method can present a variety of combinations of different generated text and different visual style modifications in the presented modified image variations. For example, a second modified image can include different generated text and the same style modification compared to a first modified image, and a third modified image can include the same generated text and a different style modification compared to the first modified image. In some implementations, the variations in generated text and and/or visual style modifications in different modified images can be randomly generated. For example, a set of suitable generated text items can be generated based on the characteristics of the image, and one of the text items in the set can be randomly selected and presented in one of the modified images. Similarly, a set of suitable visual style modifications can be generated based on a set of characteristics of the image, and one of the style modifications can be randomly selected and presented in one of the modified images.

In block 318, the method checks whether user text has been received from the user. For example, the interface can provide an option to the user to provide user input to the user interface to define user text to be added to a particular image (e.g., to the original image or to a modified image displayed in the interface). In one example, the user text can be indicated by the user to become the entire text in the image, e.g., to replace all existing generated text (and previously added user text) in the image. In another example, the user text can be indicated by the user to modify existing generated text in the image, e.g., replace one or more portions of generated text determined in block 306 (and/or previous user text) with at least a portion of the input user text. In another example, the user text can be indicated by the user to be added to existing generated text and user text in the image. For example, the user text can change existing text, add and/or remove one or more text characters, insert an additional line of user text to be displayed alongside or in a different location than existing text, etc. The user can provide user input indicating the user text in a variety of ways as described above, e.g., via touchscreen, buttons, keyboard, voice input, motion input, etc.

In some implementations, the method can receive input from the user also indicating one or more text attributes of the user text. For example, a user interface can display font options, color options, text layout options, ornament/text-frame options, and/or placement options in the image for the user, e.g., corresponding to variations determined based on the user text, image characteristics, visual style modifications, etc. Some implementations can provide an option to generate text attributes in a random fashion, e.g., allowing user input to continue to select random variations until a desired variation is displayed.

If user text has not been received in block 318, then the method continues to block 324, described below. If user text has been received, then the method continues to block 320, in which the method adds the user text to the indicated displayed modified image (or to the original image), e.g., refines text to provide refined text in the image. For example, based on the input from the user, the user text replaces some or all of existing generated text in the displayed modified image with the received user text, or adds to the image in addition to existing generated text in the image. In some examples, if the user text is to replace generated text or a portion of generated text (e.g., text added in block 308 or a previous iteration of block 320), the method can remove the replaced generated text in the displayed modified image and add the newly received user text similarly as the generated text was added in block 308. In another example, the user text is added to existing generated text.

In some implementations, the text resulting in the image after adding the user text is considered refined text. For example, generated text (and/or other existing text in the image) has been refined with user text intended by the user, e.g., to be more in accordance with the user's preferences or intent. Refining can include replacement of at least a portion of generated text (and/or other previously-added text) by user text, and can include addition of the user text to the generated text (or to other previously-added text). In some implementations, visual modifications described herein as being based on the user text can be based on the refined text.

In some implementations, the method can examine the semantic meaning of the user text and determine new text attributes and/or an image location for the user text (and any other remaining added text in the image) that are more in accordance with a meaning of the user's text. For example, the method can determine that input user text of "Romantic evening" is situated with particular types fonts, colors, and image locations that are previously associated with the word "romantic," the word "evening," and/or the phrase "romantic evening." For example, the method can select an elegant-looking font, of a larger size than the current size, and in a different location in the image (the location is not changed if the user previously moved the user text manually to a desired location). In some implementations, the new text attributes can also or alternatively be based on image characteristics and/or a determined visual style modification for the image, as described previously.

In block 322, the method automatically creates and displays one or more additional modified images having different visual modifications that are based on the user text received in block 318. One or more of the created modified images can be based also on the characteristics of the image similarly as described above for block 316. In various implementations, each different visual modification is applied to the modified image output by block 316, or can be applied to the original image, or can be applied a modified image resulting from block 308 or 312. For example, an image to which a visual modification is applied in block 322 can be restored to an earlier state (if needed) as described above before that visual modification is applied.

In another example, after receiving user text and in response to the user selecting to view one or more additional modified images, one or more visual style modifications are applied to the image including the user text (or which will include the user text) to create the one or more additional modified images. The style modifications are based at least in part on the received user text. In some implementations, the method can retain the user text in all modified images created after receiving the user text (unless the user text is further changed by the user), such that additional modified images only differ in visual style modifications. For example, this can allow the method to maintain the user's desired text and also provides visual style modifications that are in accordance with user intent as to a relevant and important subject or description of the image as indicated by the user text.

In some implementations, the text received from the user can be considered one or more characteristics of the image on which the visual style modification is based. For example, the method can generate one or more characteristics for the image based on the user text (e.g., based on semantic meaning(s) of the user text). A visual style modification associated with one or more of these characteristics can then be applied to the image having the user text. For example, if the user provided the text "Summer Memories," the method can select visual style modifications that provide a summer-like effect (e.g., lens flare, yellow tint) and/or can select style modifications that provide a visual effect associated with memories (e.g., in stored associations accessed by the method), such as a vintage, worn, and/or slightly blurry effect. In some implementations, the particular types of the set of image characteristics used to determine a visual style modification can be based on (e.g., influenced by) the user text. For example, the user text may indicate a new image content subject that was not previously detected, thus causing a different visual style modification to be used that is associated with the new image content subject.

The determined visual style modification(s) to be applied can be based on the user text and also based on one or more image characteristics not indicated by the user text. For example, a visual style modification can also be based on a set of image characteristics previously used to determine a visual style modification, e.g., in block 310 or 316, or previously in block 322. In other examples, a visual style modification can also be based on a set of image characteristics different than a set of characteristics previously used in block 310, 316, or 322. Some implementations can assign characteristics based on the user text to have greater importance or weight than any other characteristic of the image used in determining the visual style modification(s) in block 322. The method then continues to block 324.

In some implementations, the user can be allowed to select a desired visual style modification for the image, instead of (or in addition to) inputting user text. For example, a menu of style modification options can be presented to the user. In some implementations, the style options presented in the menu can be based on the characteristics and/or the text message. A user-selected visual style modification can be maintained in subsequently-created modified images similarly to user text, e.g., where generated text is varied and/or other visual style modifications are added to the user-selected style modification in the image.

In block 324, the method stores one or more modified images resulting from user selections received in the interface. For example, user selections may have created several modified images as described above. The method may have received user input selecting one or more of the modified images indicating the user has accepted the selected images as desired modifications to the image. The accepted modified images are stored in block 324, e.g., in user image collections such as albums or other accessible storage.

In some implementations block 326 can be performed, in which the method stores learning data to storage. The learning data can be based on the user selections related to modified images as described above. For example, learning data can be used to train the method over time to provide modified images that are more pertinent to the user's preferences. For example, the method can learn over time that the user tends to prefer to describe particular types of content subjects in image text and tends to prefer that such text is associated with particular types of visual style modifications. This learning can be based on the history of user selections in the user interface and the modifications that were accepted by the user as desirable. Learning data can describe the number of modified images the user generally likes to display before stopping requests for additional modified images, the number times and the types of text and style modifications the user chooses to keep, the types of image modifications that best match particular text that the user has input, etc. In some implementations, the method can use learning data from multiple users and their selections to obtain a large amount of data recording selections over a broad base of users, to provide more robust training for general selections. For example, individual training for a particular user's preferences can be used, but if no particular user preferences are available for a certain image or for certain types of characteristics, then general user preferences in training data can be used to select generated text and visual style modifications, and to generate appropriate modified images.

Some implementations can include variations of the implementations described above. For example, text and style modifications can be generated, added, and edited similarly as described above and applied to video data. In some examples, each (or a portion) of one or more video frames can be treated as an image to which text and style modifications are added. The content depicted in video frames can vary over time, which may cause additional constraints on the text and style modifications. For example, multiple frames of the video data can be examined to determine how long a particular area of the video display remains suitable for text placement, to determine whether to place text in that area and/or the amount of text to place in that area. In one example, if an area of sky remains in the video view for a length of time over a predefined time threshold, then a greater amount of text can be positioned in that sky area (e.g., "Summer trip to Paris in 2014 with friends"), which, e.g., may take a longer time to read. If the sky area does not remain in view for long or is interrupted by camera movement, then a smaller amount of text (e.g., "Paris 2014") taking a shorter amount of time to read can be placed in that area, and/or no text is placed in that area. Similarly, a style modification may only be relevant to a portion of the video sequence having particular features or other characteristics to make the style modification visible.

In some implementations, added text and/or style modifications can be changed over time in video frames of a video sequence. For example, text can be faded in and out, displayed as portions of the entire text sequentially over time, interacted with 3D objects in the image (e.g., assuming 3D depth knowledge of the video scene). In some examples, 3D estimation of a scene in the video data can use data from multiple frames in the video sequence. In some implementations, added text can be animated and/or otherwise moved to follow moving features in the video. For example, text that is positioned next to the mouth of a depicted face can be moved and/or rotated with the face as the person moves within the video view. In some implementations, the added text can be animated to be sized, compressed, stretched, or otherwise changed in conjunction with movement of features in the video and/or with a soundtrack accompanying the video. Similarly, style modifications can be faded in and out, changed to different style modifications, or otherwise changed over time in various frames of the displayed video sequence.

Various blocks and operations of methods 200 and 300 can be performed in a different order than shown and/or at least partially simultaneously, where appropriate. For example, some implementations can perform blocks of the methods at various times and/or based on events not related to a user editing an image. In some implementations, blocks or operations of methods 200 and 300 can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks instead of or in addition to a server system performing those blocks.

Figure 4:
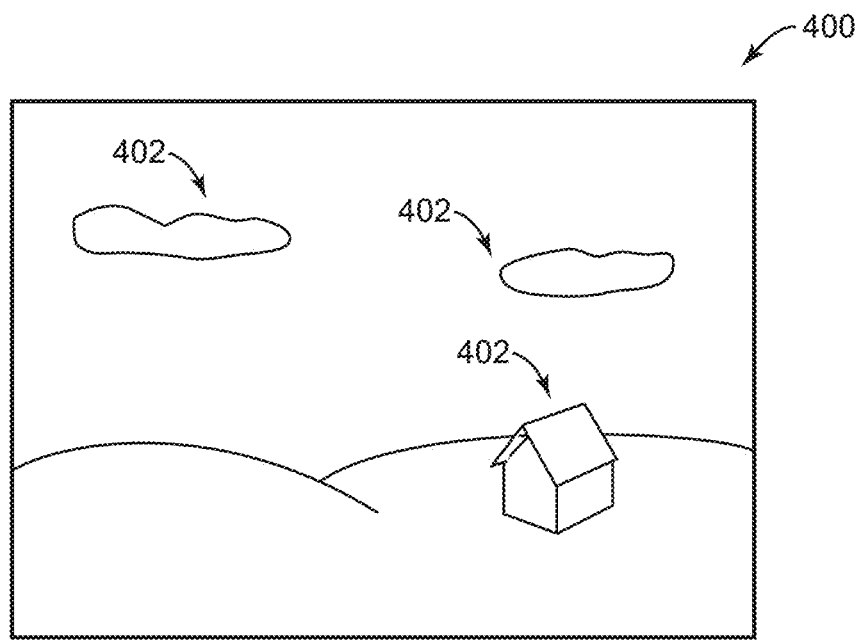
FIGS. 4-7 are diagrammatic illustrations of an example displayed user interface in use with one or more described features.

FIG. 4 is a diagrammatic illustration of an example image 400 that can be processed by one or more features described herein. In some implementations or applications, the image can be received from a variety of sources, such as memory, storage drive, or other storage associated with a particular user (e.g., on one or more client and/or server devices), and can be stored in a variety of formats, such as images in the user's photo albums, image frames in a movie or other video sequence, etc. The image 400 can be processed as described herein by a client or server device. In some implementations, the image 400 can be displayed on a display device, e.g., of a client device 120, 122, 124, and/or 126 of FIG. 1, or of a server system 102 in some implementations. In one example, the user can view the image 400 displayed by a display device in a graphical user interface provided by a client device or server device.

In some implementations, the images described in this example are associated with (e.g., captured by and/or owned by) a particular user, e.g., stored on a particular user's device or user account of a network service or other system. For example, this can allow personal preferences and data associated with that user to be used in automatically modifying images such as image 400 owned or controlled by that user. Other users can similarly have their own images stored for their own use. In some implementations, a user can view an image and have his or her associated data applied in the modification process. Other implementations can share images and/or user preferences with multiple users. In one example, a system can use another user's preferences or history of accepted modifications in determining modifications to the image of the user.

Image 400 can be automatically processed by the system to detect one or more characteristics as described above with reference to FIGS. 2 and 3. In other implementations, the user can instruct the system to process the image 400. In this example, the system has detected content subject characteristics such as objects 402 and their types (e.g., building and cloud), as well as the type of the scene being a landscape scene based on detected ground and sky areas. The system also has determined condition characteristics based on data associated with the image, such as image metadata, including time and geographic location at which the image was captured, camera parameters (e.g., camera settings), event information at time of capture, etc. User data related to a user associated with the image has also been determined, e.g., social data for the user, etc. The image 400 can be automatically enhanced with generated text and/or visual style modifications based on the detected characteristics, as described herein.

Figure 5:
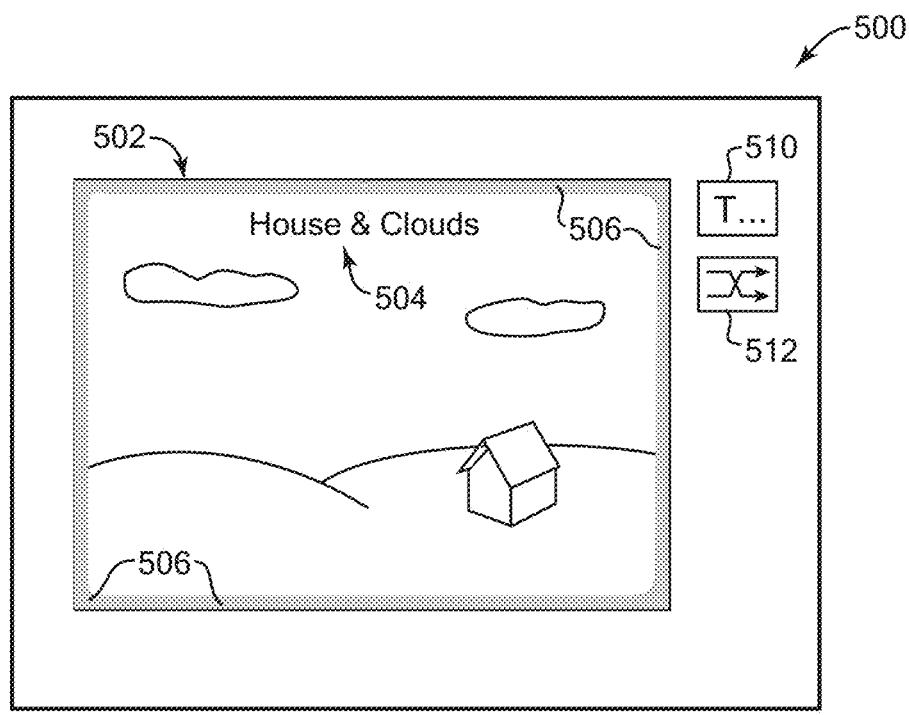

FIG. 5 is a diagrammatic illustration of an example user interface 500 that can make use of one or more features described herein. User interface 500 can be provided by a program, e.g., an image editing or image enhancement program running on a system implementing method 200 or 300, and can be displayed by a display device of such a system, in some examples.

After the image 400 has been processed and modified by the system, the modified image can be displayed in the user interface 500. For example, a modified image 502 can be displayed in interface 500, where image 502 is the result of image 400 being processed by one or more features described herein. In this example, image 502 includes generated text 504, which in this example is "House and Clouds." This generated text is a simple descriptive combination of recognized content subjects, which the system determined to be the most applicable based on the characteristics of the image. The system has displayed the generated text 504 in a location in the image determined to be suitable, e.g., in the sky and not obscuring any detected subjects of the image. In some implementations, the user can move the generated text 504 to a desired location in the image (e.g., using touch input on a touchscreen, or using some other input device), if the determined location is not desirable.

In addition, image 502 includes a visual style modification 506, which in this example is a small vignette, e.g., a darkening of the image near its borders and corners. This style modification was determined by the system to be appropriate to the image 400 based on its characteristics. For example, the outdoor scene in image 400 may have caused the system to assign a vignette style, from which landscape images can generally benefit visually.

User interface 500 can also display controls which can be selected by the user (e.g., using a touchscreen or other input device) to access various functions provided by the user interface and its associated program. For example, a text input button 510 can be selected by the user to provide an input field to allow the user to input his or her own user text. A shuffle button 512 can be selected by the user to cause a modified image to be displayed in place of image 502 with different text and/or image style, where the text and/or image style is randomized in this example. For example, in the current state of the user interface 500, both the image text and image style are randomized for a modified image if button 512 is selected. In other implementations, a first button can be provided to randomize image text and present new text, and a different, second button can be provided to randomize image style and present a new visual style modification. Other implementations can display other types of controls (e.g., sliders, menus, etc.). Other interface implementations can also display controls that offer non-randomized modified images. For example, when such a control is selected, the system can modify the image 400 with the next text item and visual style modification in an internally-scored, ranked, and/or ordered list of modifications.

Figure 6:
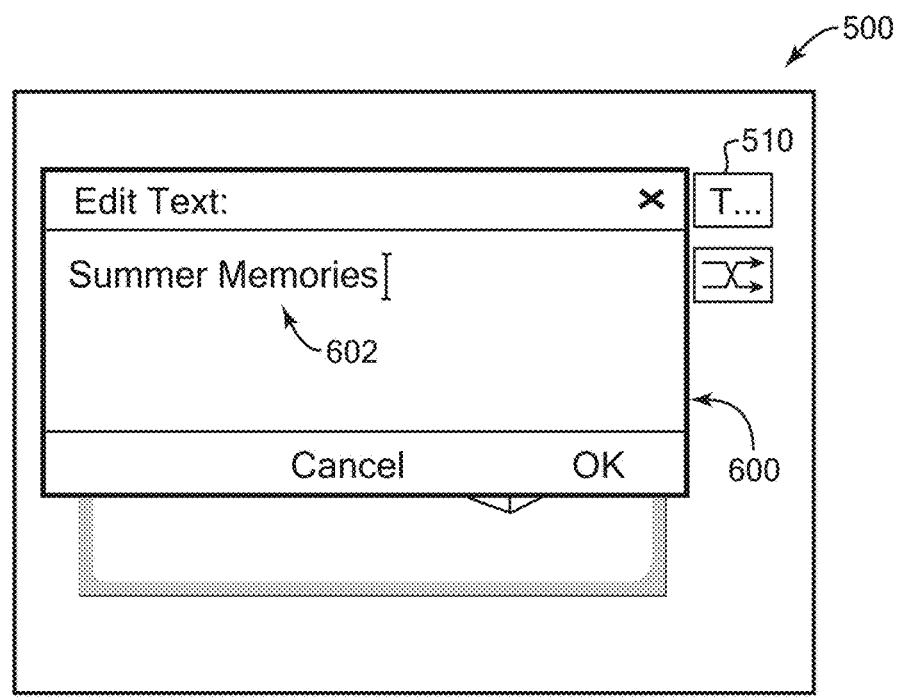

FIG. 6 is a diagrammatic illustration of user interface 500 displaying a text input box 600. The user has selected text input button 510 of interface 500, and in response, the system displays text input box 600. Input box 600 can be displayed over interface 500, or can be displayed to the side of the interface 500 if the display area of the display device is sufficiently large. In this example, the user has input a desired user text 602 in the input box 600.

Figure 7:
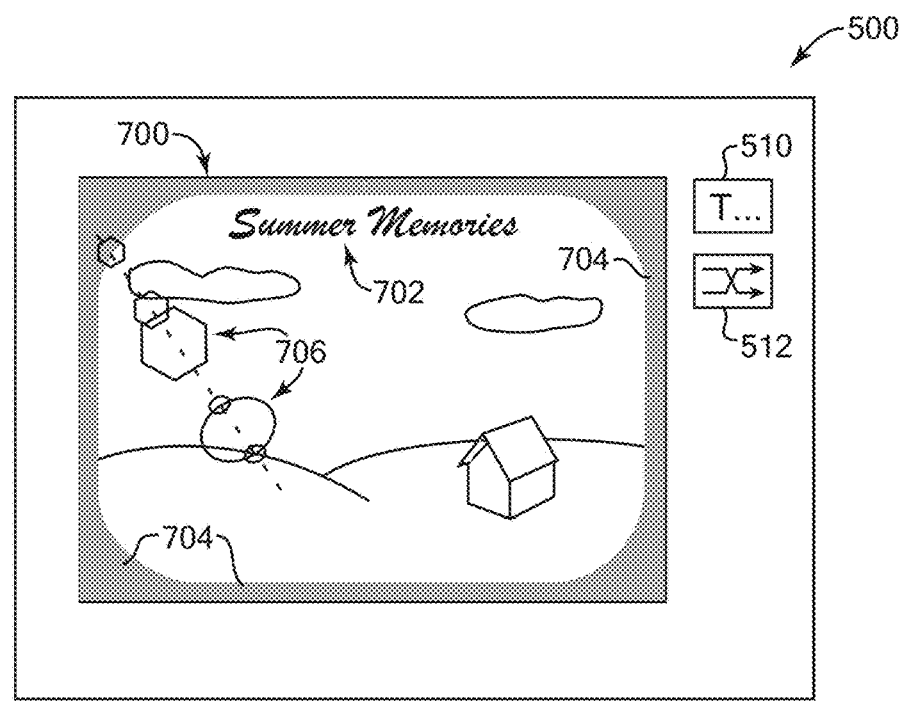

FIG. 7 is a diagrammatic illustration of user interface 500 displaying a new modified image 700 that is a modified variant of the original image 400 and modified image 502. In this example, the system has received the user text 602 input by the user in text box 600 and has placed the user text 602 directly in the new modified image 700 as refined text 702 that has the same characters as the user text 602 (e.g., the system has generated a new modified image from image 400 that has the text message 702). The refined text 702 includes the user text and also is displayed in particular font, size, color, and other text attributes that the system has determined matches the user text 602. For example, the system may have found that an italic font and larger size have a predefined association with the semantic meaning of the user text 602, and presents the refined text 702 in the associated font and size.

Furthermore, the system has automatically changed the visual style of the image to be more in accordance with the user text. In this example, the system has found that a larger, darker vignette modification is associated with the word "memories." In response, the system provides a stronger and larger vignette 704 around the borders of the new modified image. For example, the stronger vignette may enhance an effect of the image portraying an old memory of the user. In addition, the system has found that a lens flare filter effect has been previously associated with the word "summer." In response, the system adds a lens flare style modification 706 to the new modified image 700 to simulate sunlight impinging on a camera lens of a camera capturing the image.

The controls in interface 500 include the text input button 510 to allow the user to input new and different user text, if desired, that can override the previous user text 602, e.g., modify and/or add to the previous user text 602. The shuffle button 512 causes a new modified image to be created for the image 400 having randomly selected visual image modification(s) as described above. In some implementations, the randomized modified image can retain the refined text 702 since that text was input and intended by the user. The randomized modified image can have a randomized visual style modification that is determined by the system based at least in part on the refined text 702 (and/or based at least in part on the user text 602).

Some implementations can allow the user to control image modifications to a greater degree than described above for FIGS. 5-7. In some examples, the user may be able to input keywords indicating a type of style modification that the user desires to be applied. The user may be able to select a desired style modification from a displayed menu. The system can create and display different modified images retaining the selected style modification. In some implementations, the system can create and display different modified images that provide style modifications that are variations of the user-selected style modification, e.g., having small color changes, brightness changes, etc. from the selected style modification. Some implementations can also or alternatively provide options in the user interface for a user to select and change particular text attributes for generated text and/or user text.

Figure 8:
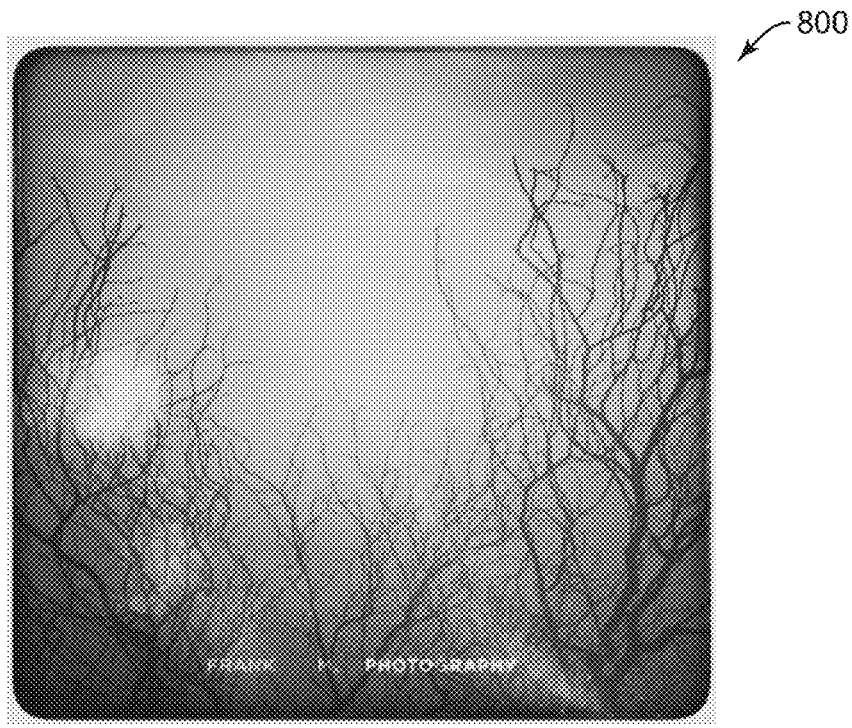
FIGS. 8-9 are diagrammatic illustrations of example images modified using one or more features described herein.
Figure 9:
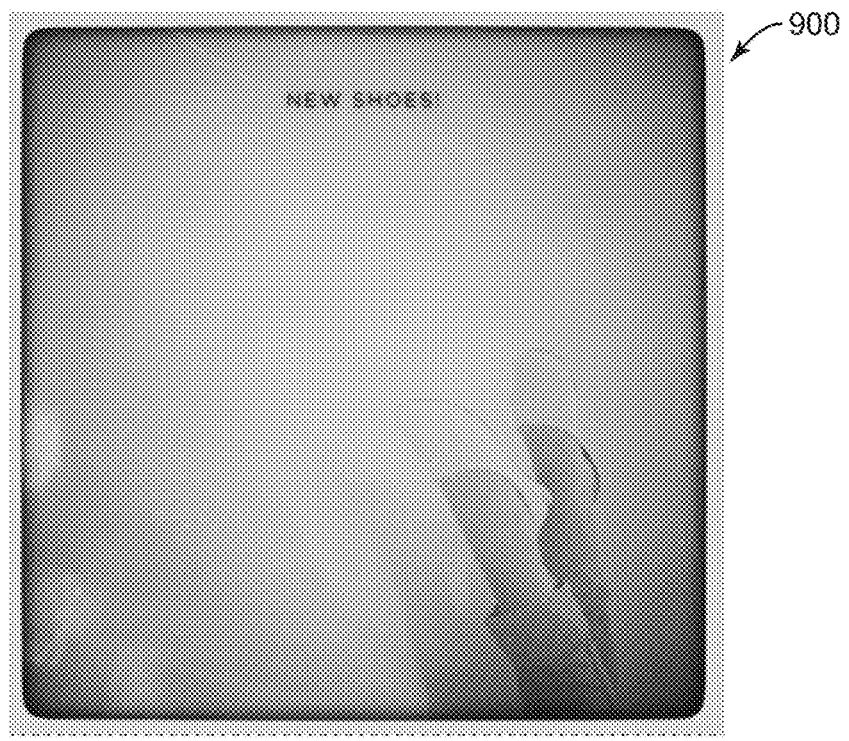

FIGS. 8 and 9 are diagrammatic illustrations of example images, e.g., which can be displayed by a display device of a system used by a user, that have been processed according to one or more features described herein. FIG. 8 shows an example modified image 800 in which generated text has been inserted in the lower portion of the image. The generated text was determined by the system by taking the name of the associated user and appending a word "photography" to the name. In this example, no characteristics of the image were strong enough for the system to make a determination of more specific text, so generic text including user name and a generic descriptive word were selected as the generated text. A visual style modification is applied after the generated text is added. The style modification includes a vignette to darken the areas of the image near the borders and corners and a lens flare, which in this example are visual style modifications that were associated with an outdoor scene as recognized in the image by the system (e.g., by detecting the depicted trees). Since the generated text was added to the image first and then the style modifications were applied to the generated text along with the entire image, the generated text may appear more integrated with the image than if the text had been added to the image after the style modifications were applied.

FIG. 9 shows an example modified image 900 in which text and style modifications have been made. The generated text "New Shoes!" is determined by the system based on the image content characteristics, including depicted shoes that have been recognized by the system, e.g., using object recognition techniques and/or analysis of user messages associated with the image. For example, the system can determine that the associated user has bought new shoes by examining user characteristics, such as social data in which the associated user sent a message to friends saying that new shoes had been bought (and/or by examining user financial purchase data, if such data is available). The system also may have examined condition characteristics such as the capture date of the image. In this example, since the capture date falls within a threshold date range close to the purchase of the shoes, the system may have assumed that these depicted shoes are the new shoes referenced in the social data. The system then creates the generated text, e.g., based on a text excerpt from social data. A visual style modification is then applied to the image, which includes a vignette filter to darken the areas of the image near the borders and corners, and a lens flare added on the left area. In this example, these style modifications were ones that the user previously preferred in other images based on a history of accepted style modifications that the system can access, and so the same or similar style modifications are applied to this image.

Figure 10:
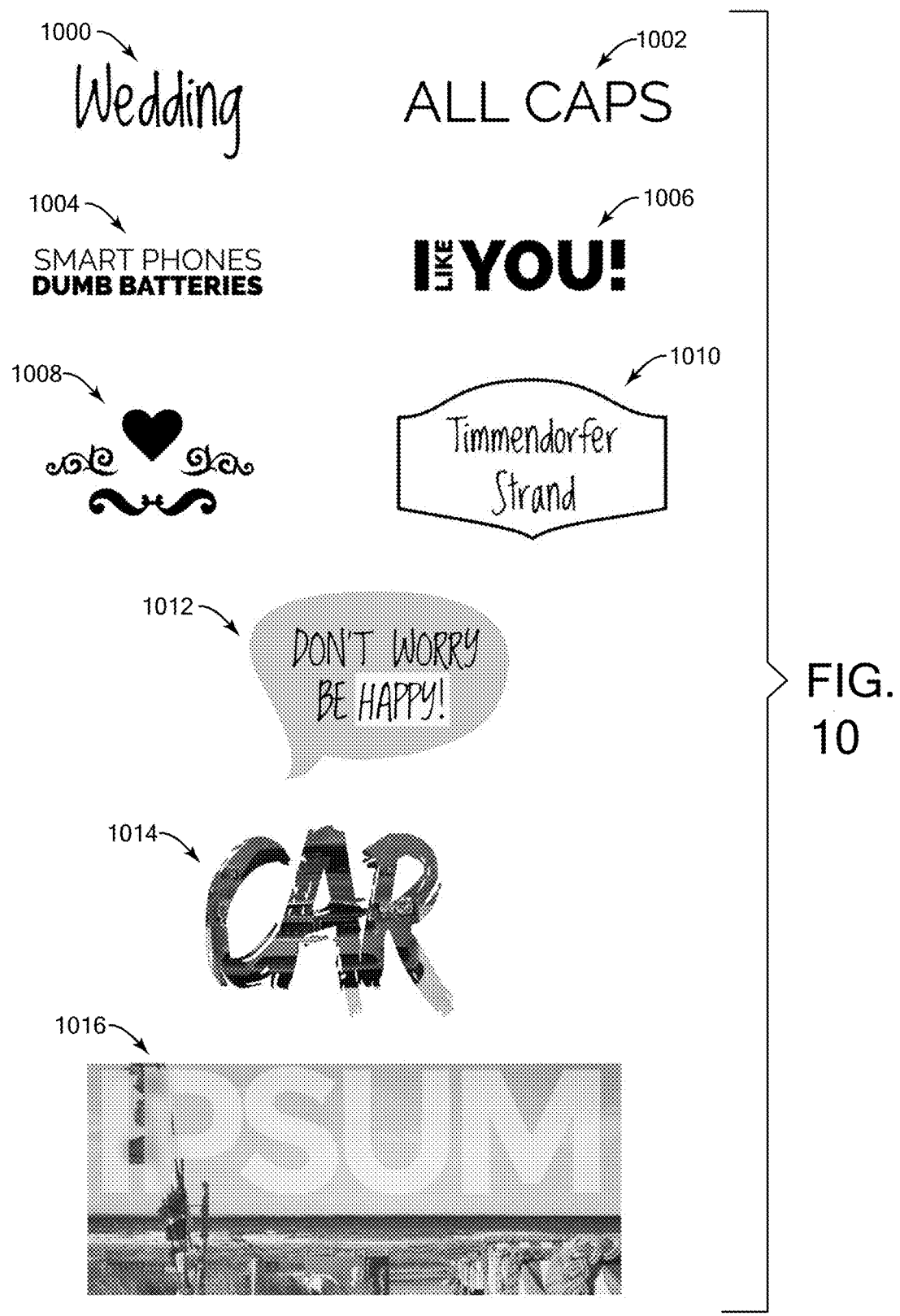
FIG. 10 is a diagrammatic illustration of examples of generated text and text attributes.

FIG. 10 shows examples of generated text and/or user text that can be placed in an image as described herein, where each text example has one or more example text attributes. Text 1000 shows an example text attribute of a font that has been associated with the semantic meaning of the text. In this example, the text "wedding" has been associated with the font shown. In some implementations, other fonts can also be associated with this text and can be used in other generated text attribute variations in various modified images. A particular font can be randomly selected, selected by a user, etc. for each variation.

Text 1002 shows an example text attribute of a text case, which in this example is all capital letters (uppercase characters). Other generated text cases can be all lowercase characters, mixed uppercase and lowercase characters, etc. Text 1004 shows an example text attribute of justification, where two lines of text are both fully-justified on left and right sides to align with straight vertical edges. Other variations can include left-aligned text, right aligned text, and center justified or center-aligned text. Sample 1004 also shows an example of different fonts on different text lines, with a non-bold font on the first text line and a bold font on the second text line. Text 1006 shows an example text attribute of orientation, where one of the words of the text has been rotated 90 degrees and spaced to the height of the other text. Other variations can rotate other words, characters, etc.

Sample 1008 shows an example of a graphical ornament that can be associated with generated text or user text. In this example, the ornament can be positioned around or near text to embellish the text graphically. Particular ornaments can be associated with particular text words or semantic meanings (e.g., categories, etc.), with particular image characteristics, and/or with particular style modifications. For example, heart ornaments can be associated with text and style modifications with a love theme, wave ornaments can be associated with an ocean or lake content subjects depicted in the image, etc. Alternatively, some ornaments can be considered generic and can be associated and placed with any text.

Sample 1010 shows an example of a text frame that can be placed around generated text or user text (to be distinguished from the image frame style modification described above). The text frame can be a border that is used to emphasize text, and can partially or completely surround text. Sample 1012 shows an example of a text bubble (e.g., a graphical ornament) that can be placed underneath text to emphasize the text, add a thematic context to the text, etc. Other types or shapes of graphical ornaments or text areas can be placed under text in other variations. Sample 1012 also shows an example of a particular word "happy" that has been more emphasized than the other words of the text by highlighting the word, e.g., placing a lighter background under the word.

Text 1014 shows an example of text that includes portions of an image. For example, the outlines of the text can act as a stencil such that portions of an image can be included within the text outlines. Some text can include image portions that are relevant to the semantic meaning of the text, e.g., depicted vehicles can be shown within the outlines of the word "car" as shown. The image portions can be obtained from other images, in some examples. Other text-outline effects can include different patterns within text outlines. Text 1016 shows an example of text that has been blended into the image, where the text is semi-transparent such that part of the image is displayed through the text. Other variations of text can have other levels of transparency. In some other examples, the text can be blurred or pixels of the image can be inverted within the outlines of the text characters. Some examples can use the text as a mask for creating a glow, shadow, or other effect around the text outline, e.g., where the text is visible through the outline effect.

Figure 11A:
FIG. 11A-11C are diagrammatic illustrations of additional example images modified using one or more features described herein.
Figure 11B:
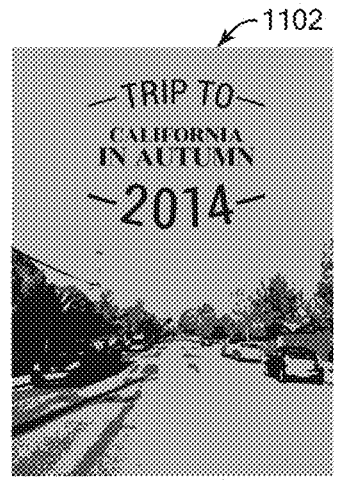
Figure 11C:

FIGS. 11A-11C show example modified images that include generated text with various text attributes similar to attributes described above with reference to FIG. 10. Each of the examples can be further modified with style modification(s) that can modify the image and the placed text as described above. In one example implementation of displaying these images, the various lines of text and ornaments can be layered, e.g., vertically stacked on the image as different portions of rendered text.

FIG. 11A shows an example image 1100 including generated text based on the time and location of image capture, e.g., determined based on location data, time data, and/or recognized features such as the depicted monument. The generated text includes multiple text lines having different fonts, in a fully justified (centered) layout in its text area. Some words have a larger size to fit within the left and right margins of a text area rectangle. The word "Schwerin" is sized smaller and is placed on a graphical ornament that fills its text line to the margins of the text area to emphasize the word. The date "2014" is placed on a different graphical ornament and is centered on its text line without ornaments or extensions to the left and right margins of the text area.

FIG. 11B shows an example image 1102 including generated text based on location data and time data of the image. Some words are smaller sized and their text line includes horizontal line ornaments to fill the line (e.g., "trip to" and "2014"). In addition, these ornamented text lines are slightly rotated, e.g., are aligned along curved text paths. Other words are centered in a non justified layout. The text attributes of the text in FIG. 11B can be variations to the text attributes of the text in FIG. 11A, for example.

FIG. 11C shows an example image 1104 including generated text based on location data and time data of the image. Words are varied in size to fit the left and right margins in a fully justified layout. Some words are smaller sized and their text line includes graphical ornaments (pointing hands) to fill the line (e.g., for the text line including the word "autumn"). Other words are larger sized to fit the left and right margins (e.g., "2014"). Various graphical ornaments are also added in lines above the word text and below the date text. The text attributes of the text in FIG. 11C can be variations to the text attributes of the text in FIGS. 11A and 11B, for example.

Figure 12:
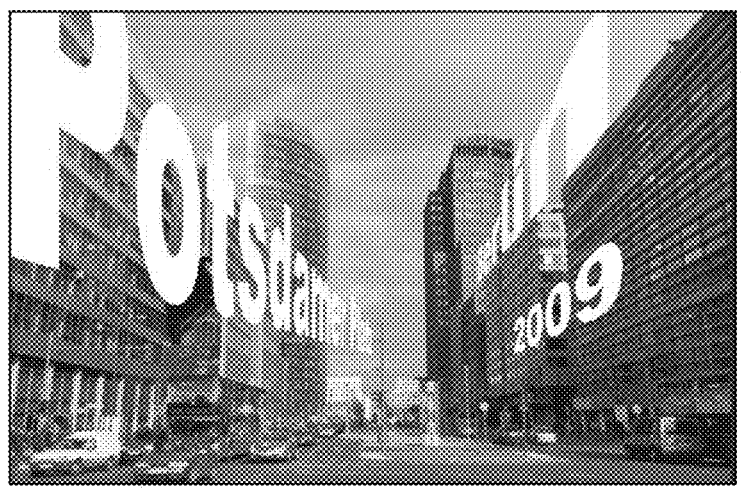
FIG. 12 is a diagrammatic illustration of another example image modified using one or more features described herein.

FIG. 12 shows an example modified image 1200 in which text modifications have been made based on one or more features described herein. In this example, the system has estimated a 3D model of the depicted scene, e.g., based on depth data accompanying the image and/or based on analyzing the content of the image. For example, the system has determined one or more vanishing points in the image and determined estimated depths of various portions of the depicted buildings and street. The system generates text based on location data and time data associated with the image, and transforms the text to appear three dimensional in the image. For example, the system determines to transform the text to appear as if it is aligned with the buildings, e.g., appearing with similar vanishing points as those found in the image. Thus, text is placed as if it is parallel to or placed on the walls of the buildings, receding to a smaller size into the distance as shown in the image.

Figure 13:
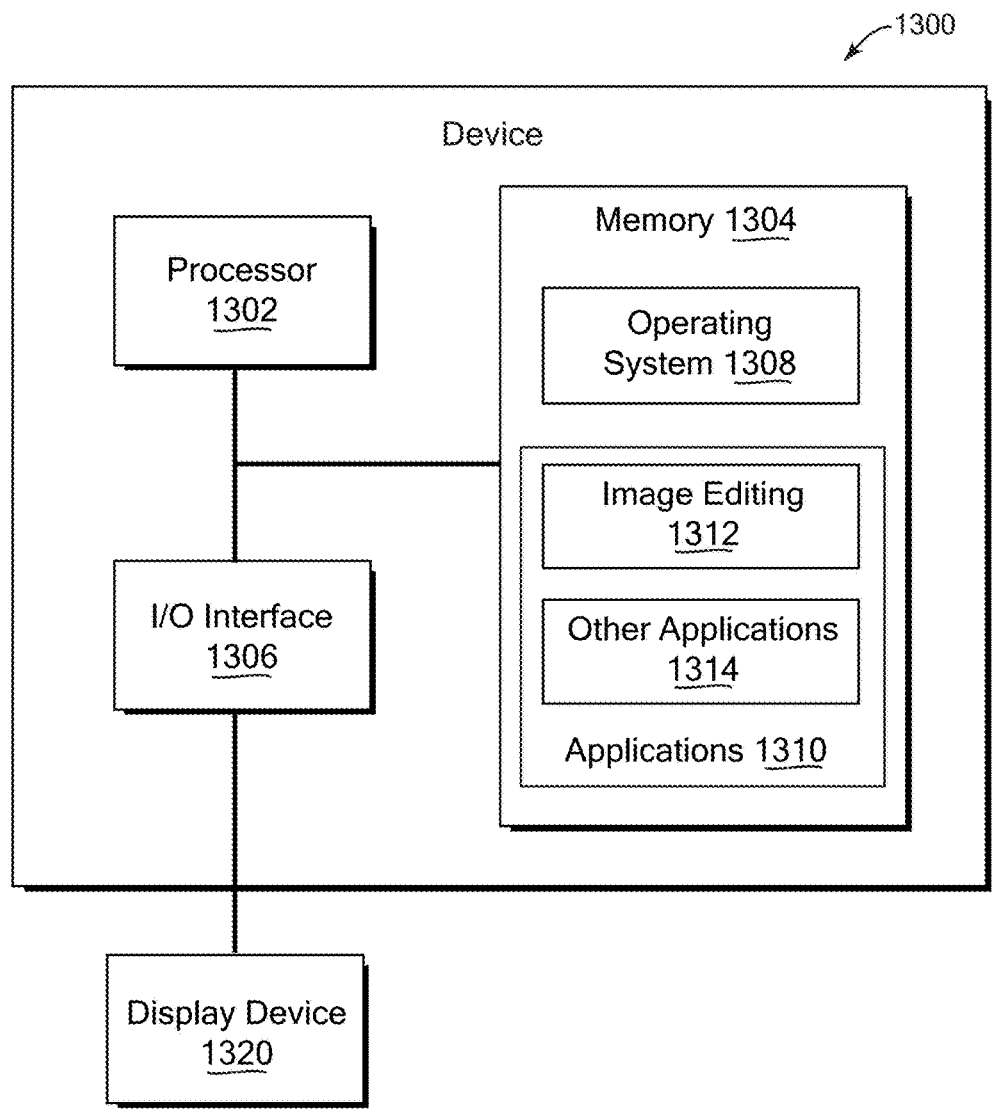
FIG. 13 is a block diagram of an example device which may be used for one or more implementations described herein.

FIG. 13 is a block diagram of an example device 1300 which may be used to implement one or more features described herein. In one example, device 1300 may be a computer device used to implement a server device, e.g., server device 104 of FIG. 1, and perform appropriate method implementations described herein. Device 1300 can be any suitable computer system, server, or other electronic or hardware device. For example, the device 1300 can be a mainframe computer, desktop computer, workstation, portable computer, or electronic device (portable device, cell phone, smart phone, tablet computer, television, TV set top box, personal digital assistant (PDA), media player, wearable device, game device, etc.). In some implementations, device 1300 includes a processor 1302, a memory 1304, and input/output (I/O) interface 1306.

Processor 1302 can be one or more processors or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1304 is typically provided in device 1300 for access by the processor 1302, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1304 can store software operating on the device 1300 by the processor 1302, including an operating system 1308 and one or more applications 1310 such as an image editing and/or processing engine, web hosting engine, social networking engine, etc. In some implementations, the applications 1310 can include instructions that enable processor 1302 to perform the functions described herein, e.g., some or all of the methods of FIGS. 2-3. For example, applications 1310 can include one or more image editing applications 1312, including an image editing program to receive user input, modify pixels of images (e.g., by applying one or more edit operations to apply visual modifications to an image), and provide output data causing display of the images on a display device of the device 1300. An image editing program, for example, can provide a displayed user interface responsive to user input to display selectable options/controls and images based on selected options. Other applications or engines 1314 can also or alternatively be included in applications 1310, e.g., media display applications, communication applications, web hosting engine or application, social networking engine or application, etc. Any of software in memory 1304 can alternatively be stored on any other suitable storage location or computer-readable medium. In addition, memory 1304 (and/or other connected storage device(s)) can store images (original and modified), edit operation data, associations between text items and image characteristics, associations between visual style modifications and image characteristics, history of user selections of enhancements, event and calendar data related to a user, and other data used in the features described herein. Memory 1304 and any other type of storage (magnetic disk, optical disk, magnetic tape, or other tangible media) can be considered "storage" or "storage devices."

I/O interface 1306 can provide functions to enable interfacing the device 1300 with other systems and devices. For example, network communication devices, storage devices such as memory and/or database 106, and input/output devices can communicate via interface 1306. In some implementations, the I/O interface can connect to interface devices such as input devices (keyboard, pointing device, touchscreen, microphone, camera, scanner, etc.) and output devices (display device, speaker devices, printer, motor, etc.). A display device 1320 is one example of an output device that can be used to display content, e.g., one or more images provided in an image editing interface or other output application as described herein. Display device 1320 can be connected to device 1300 via local connections (e.g., display bus) and/or via networked connections and can be any suitable display device, some examples of which are described below.

For ease of illustration, FIG. 13 shows one block for each of processor 1302, memory 1304, I/O interface 1306, and software blocks 1308 and 1310. These blocks may represent one or more processors or processing circuitries, operating systems, memories, I/O interfaces, applications, and/or software modules. In other implementations, device 1300 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can be computer devices including some similar components as the device 1300, such as processor(s) 1302, memory 1304, and I/O interface 1306. An operating system, software and applications suitable for the client device can be provided in memory and used by the processor, such as an image editing program, client communication application software, etc. The I/O interface for a client device can be connected to network communication devices, as well as to input and output devices such as a microphone for capturing sound, a camera for capturing images or video, audio speaker devices for outputting sound, a display device for outputting images or video, or other output devices. A display device 1320, for example, can be connected to (or included in) the device 1300 to display the images, interfaces, and other data as described herein, where such device can include any suitable display device such as an LCD, LED, or plasma display screen, CRT, television, monitor, touchscreen, 3-D display screen, projector, or other visual display device. Some implementations can provide an audio output device, such as voice output or synthesis that speaks text and/or describes settings, notifications, and permissions.

One or more methods described herein (e.g., methods 200 and/or 300) can be implemented by computer program instructions or code, which can be executed on a computer. For example, the code can be implemented by one or more processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems discussed here may collect personal information about users (e.g., user data), or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method to provide visual modification to an image, the method comprising:
    determining a set of characteristics of the image;
    applying one or more first visual modifications to the image based on one or more characteristics of the set of characteristics of the image, wherein the applying comprises changing pixel values of a first plurality of pixels of the image;
    receiving user input defining user text, wherein the user text has a semantic meaning that indicates image content that is not previously detected in the image;
    adding the user text into the image as a second visual modification to the image, wherein adding the user text includes changing pixel values of a second plurality of pixels of the image; and
    selecting and applying one or more third visual modifications to the image in response to receiving the user input defining the user text, wherein the one or more third visual modifications are selected based on a stored association with the image content indicated by the semantic meaning of the user text and based on a stored association with at least one characteristic of the set of characteristics of the image,
    wherein the one or more third visual modifications include changing pixel values of one or more particular pixels of the image, wherein the one or more particular pixels include pixels different from the second plurality of pixels and pixels that are excluded from all text in the image after the one or more third visual modifications are applied, wherein applying the one or more third visual modifications includes applying one or more edit operations to the image, wherein the one or more edit operations produce at least one of a vintage effect, a lens flare effect, a vignette effect, or a blur effect in the image.

2. The method of claim 1 wherein applying one or more first visual modifications includes:

detecting one or more content subjects depicted in the image; and automatically generating generated text based on a semantic meaning of the one or more content subjects depicted in the image and adding the generated text to the image.

3. The method of claim 2 wherein generating the generated text includes transforming the generated text to appear three-dimensionally within a scene depicted in the image.

4. The method of claim 2 wherein automatically generating the generated text includes modifying a portion of the image on which the generated text is to be placed, wherein modifying a portion of the image includes blurring the portion of the image.

5. The method of claim 1 wherein the one or more first visual modifications and the one or more third visual modifications include one or more visual style modifications for the image, wherein the one or more first visual style modifications and the one or more third visual style modifications exclude adding new text to the image, wherein applying the one or more third visual modifications includes applying the one or more third visual modifications to the user text added to the image.

6. The method of claim 5 wherein the one or more first visual style modifications apply at least one edit operation to the image to provide one or more visual effects in the image, wherein the one or more visual effects include at least one of: a vintage effect, a lens flare effect, a vignette effect, or a blur effect.

7. The method of claim 1 wherein determining the set of characteristics of the image includes identifying one or more image content characteristics that indicate one or more content subjects depicted in the image, wherein the one or more content subjects include at least one of: one or more persons, one or more moods of persons as indicated by one or more facial features of the one or more persons, one or more objects, one or more landmarks, one or more landscape features, or one or more weather effects recognized and depicted in the image, and wherein the one or more first visual modifications have a predefined association with the one or more characteristics of the set of characteristics, wherein the one or more third visual modifications have a predefined association with the at least one characteristic of the set of characteristics, and wherein the one or more third visual modifications apply one or more edit operations to the image, wherein the one or more edit operations include at least one of: a sharpening operation, or a blur operation.

8. The method of claim 1 wherein determining the set of characteristics of the image includes identifying one or more condition characteristics that indicate one or more conditions associated with the image, wherein the condition characteristics are identified based on stored data associated with the image, and wherein the one or more condition characteristics include at least one of:

a time at which the image was captured, a geographical location at which the image was captured indicated by location data, or one or more camera parameters of a camera that captured the image, wherein the one or more third visual modifications have a predefined association with the at least one characteristic of the set of characteristics, and wherein the one or more third visual modifications apply one or more edit operations to the image, wherein the one or more edit operations include at least one of: a sharpening operation, or a blur operation.

9. The method of claim 1 wherein applying one or more first visual modifications includes automatically generating generated text based on a plurality of characteristics of the set of characteristics and adding the generated text to the image, wherein the plurality of characteristics include different types of characteristics including two or more of: a time of capture of the image, a location of capture of the image, a face content subject depicted in the image, or a landmark content subject depicted in the image, and wherein automatically generating the generated text includes automatically selecting the generated text from a list of predetermined text items associated with a combination of multiple of the different types of the plurality of characteristics of the set of characteristics on which the generated text is based.

10. The method of claim 1 further comprising:

generating and causing display of a plurality of modified images based on the image, wherein each modified image includes a different modification for the one or more first third visual modifications based on a different characteristic of the set of characteristics of the image, such that a modification in a first modified image is based on image content, and a modification in a second modified image is based on one of a geographical location at which the image was captured indicated by location data, or a time of capture of the image, wherein each modified image includes the user text.

11. The method of claim 1 wherein the one or more third modifications modify an entirety of the image.

12. The method of claim 1 further comprising, before applying the one or more third modifications, presenting a menu of multiple different modification options based on the user text and based on at least one of the one or more characteristics, wherein each of the different modification options is associated with a different set of edit operations configured to change pixels of the image; and receiving user input selecting a particular modification option of the multiple different modification options, wherein the one or more third modifications are applied to the image based on the particular modification option.

13. The method of claim 1 wherein the stored association between the one or more third visual modifications and the image content indicated by the semantic meaning of the user text is customized for a user associated with the image.

14. A system to provide text and visual styling in images, the system comprising:

a storage device that stores an image; and at least one processor coupled to the storage device and configured to perform operations comprising:

determining a set of characteristics of the image;

applying one or more first visual modifications to the image based on one or more characteristics of the set of characteristics of the image, wherein the applying comprises changing pixel values of a first plurality of pixels of the image;

receiving user input defining user text;

adding the user text in the image as a second visual modification to the image, wherein adding the user text includes changing pixel values of a second plurality of pixels of the image;

presenting a menu of multiple different modification options based on the user text and based on at least one of the one or more characteristics, wherein each of the different modification options is associated with a different set of edit operations configured to change pixels of the image;

receiving user input selecting a particular modification option of the multiple different modification options; and applying one or more third visual modifications to the image that are based on the particular modification option, wherein the one or more third visual modifications include changing pixel values of one or more pixels of the image, wherein the one or more third visual modifications apply one or more edit operations to the image.

15. The system of claim 14 wherein the at least one processor is further configured to perform operations comprising:

obtaining a semantic meaning of the user text; and determining one or more visual text attributes associated with the semantic meaning of the user text, wherein the one or more visual text attributes characterize a visual appearance of text; and modifying the user text to provide modified user text that has the one or more visual text attributes, wherein adding the user text in the image includes adding the modified user text to the image.

16. The system of claim 14 wherein the one or more third visual modifications apply at least one edit operation to the image to provide one or more visual effects in the image, wherein the one or more visual effects include at least one of: a vintage effect, a lens flare effect, a vignette effect, or a blur effect.

17. The system of claim 14 wherein the operation of applying the one or more first visual modifications includes automatically generating generated text based on the one or more characteristics, wherein at least a portion of the generated text in the image is replaced with at least a portion of the user text, and wherein the one or more third visual modifications exclude adding new text to the image.

18. The system of claim 14 wherein the one or more edit operations include at least one of: a sharpening operation, or a blur operation.

19. A non-transitory computer readable medium having stored thereon instructions to provide visual modification to an image and, when executed by a processor, cause the processor to:

determine a set of characteristics of the image;

apply one or more first visual modifications to the image based on one or more characteristics of the set of characteristics of the image, wherein the applying comprises changing pixel values of a first plurality of pixels of the image;

receive user input defining user text, wherein the user text has a semantic meaning that indicates image content that is not previously detected in the image;

add the user text in the image as a second visual modification to the image, wherein adding the user text includes changing pixel values of a second plurality of pixels of the image; and select and apply one or more third visual modifications to the image in response to receiving the user input defining the user text, wherein the one or more third visual modifications are selected based on a stored association with the image content indicated by the semantic meaning of the user text and based on a stored association with at least one characteristic of the set of characteristics of the image, wherein the one or more third visual modifications exclude adding new text to the image and include changing pixel values of one or more particular pixels of the image, wherein the one or more particular pixels include pixels different from the second plurality of pixels and pixels that are excluded from all text in the image after the one or more third visual modifications are applied, wherein the one or more third visual modifications apply one or more edit operations to the image, wherein the one or more edit operations produce one or more visual effects in the image, wherein the one or more visual effects include at least one of: a vintage effect, a lens flare effect, a vignette effect, or a blur effect.

20. The non-transitory computer readable medium of claim 19 further comprising, before applying the one or more third modifications, presenting a menu of multiple different modification options based on the user text and based on at least one of the one or more characteristics, wherein each of the different modification options is associated with a different set of edit operations configured to change pixels of the image; and receiving user input selecting a particular modification option of the multiple different modification options, wherein the one or more third modifications are applied to the image based on the particular modification option.

\* \* \* \* \*

UNITED STATES PATENT AND TRADEMARK OFFICE
CERTIFICATE OF CORRECTION

PATENT NO. : 10,049,477 B1
APPLICATION NO. : 14/752658
DATED : August 14, 2018
INVENTOR(S) : Kokemohr et al.

Page 1 of 1

It is certified that error appears in the above-identified patent and that said Letters Patent is hereby corrected as shown below:

In the Claims

In Column 38, Line 33, please delete "first third" and insert -- third -- therefor.

Signed and Sealed this
Twenty-eighth Day of September, 2021

Drew Hirshfeld
*Performing the Functions and Duties of the
Under Secretary of Commerce for Intellectual Property and
Director of the United States Patent and Trademark Office*